United States Patent [19]

Mellows et al.

[11] Patent Number: 6,091,822

[45] Date of Patent: Jul. 18, 2000

[54] METHOD AND APPARATUS FOR RECORDING SCRAMBLED VIDEO AUDIO SIGNALS AND PLAYING BACK SAID VIDEO SIGNAL, DESCRAMBLED, WITHIN A SECURE ENVIRONMENT

[75] Inventors: Andrew B. Mellows, Palo Alto; John O. Ryan, Cupertino; William J. Wrobleski, Sunnyvale; Ronald Quan, Cupertino; Gerow D. Brill, Mountain View, all of Calif.

[73] Assignee: Macrovision Corporation, Sunnyvale, Calif.

[21] Appl. No.: 09/004,600

[22] Filed: Jan. 8, 1998

[51] Int. Cl.$^7$ ...................................................... H04N 7/167
[52] U.S. Cl. .......................... 380/210; 380/205; 380/213; 380/222; 380/236; 386/46; 386/57; 386/79; 386/94
[58] Field of Search ................................... 380/10, 13–15, 380/17, 20, 22, 23, 38, 52, 59; 386/46, 57, 79, 97

[56] References Cited

U.S. PATENT DOCUMENTS

| | | | |
|---|---|---|---|
| 4,030,128 | 6/1977 | Perret | 360/33 |
| 4,672,474 | 6/1987 | Rodal | 360/70 |
| 5,058,159 | 10/1991 | Quan | 380/19 |
| 5,357,276 | 10/1994 | Banker et al. | 348/7 |
| 5,583,936 | 12/1996 | Wonfor et al. | 380/15 |
| 5,889,919 | 3/1999 | Inoue et al. | 386/94 |

*Primary Examiner*—Tod R. Swann
*Assistant Examiner*—Paul E. Callahan
*Attorney, Agent, or Firm*—Gerow Brill; George Almeida

[57] ABSTRACT

A technique is disclosed for preventing unauthorized playback of scrambled video/audio signals recorded on, for example, a video tape cassette, which technique includes several cooperating processes and apparatus which further prevent the playback of recorded video/audio when the playback apparatus is in a still or pause mode of operation. The technique includes selected combinations of processes of inverting and re-clamping the luminance component of the video signal just prior to FM modulation; blanking an overscan portion, or portions, of the video signal and adding a video retrace signal to the overscan portion(s); inverting the normal control track signal and position modulating the normally unused edge; and selectively scrambling the audio signal and recording the scrambled audio signal in an audio track or in a Hi-Fi track. A selected user specific authorization code is recording in and recovered from the audio track. The recorded scrambled video/audio signal is recovered via a modified combo VCR/TV unit with no external video/audio jacks, which reverses the scrambling processes mentioned above, but only if the descrambling apparatus is authorized by having the proper recovered authorization code.

47 Claims, 10 Drawing Sheets

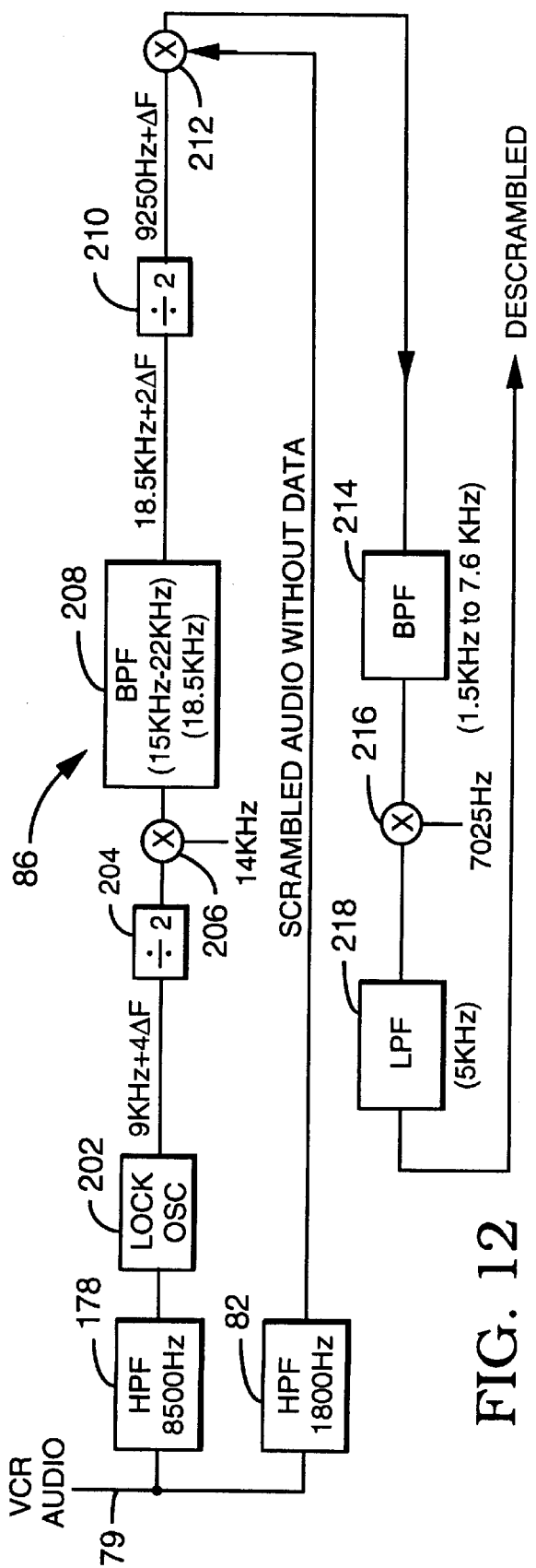
FIG. 12
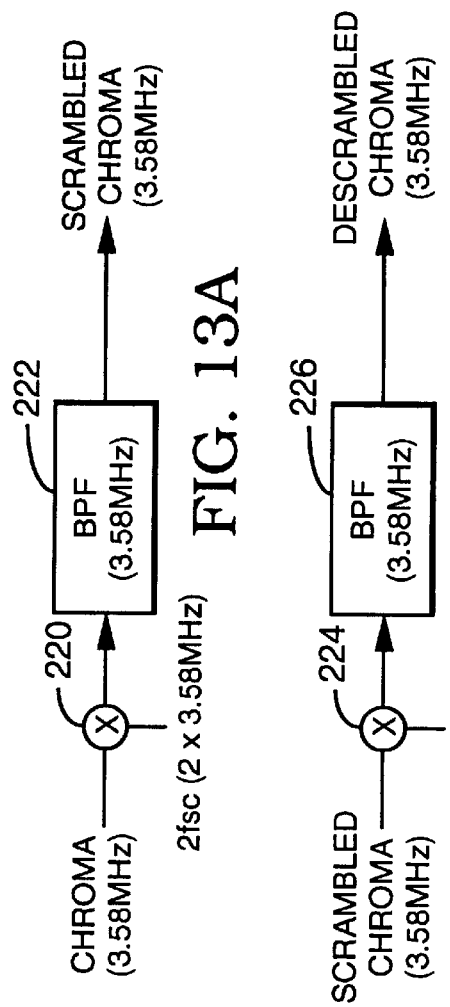
FIG. 13A
FIG. 13B

METHOD AND APPARATUS FOR RECORDING SCRAMBLED VIDEO AUDIO SIGNALS AND PLAYING BACK SAID VIDEO SIGNAL, DESCRAMBLED, WITHIN A SECURE ENVIRONMENT

BACKGROUND OF THE INVENTION

1. Field of the Invention

The present invention pertains to an inexpensive method and apparatus for recording a scrambled video signal and playing back the video signal in descrambled format within a secure environment.

2. Description of the Prior Art

This invention relates to an inexpensive method and apparatus for scrambling and descrambling a video signal. More particularly, this invention relates to an improved arrangement for scrambling the video and audio signals, adding an authorization code to the audio and playing back descrambled video and audio signals when authorized within a secure environment.

Scrambling of television signals has been done in many ways. Some of these techniques are recordable and some are not. Each of these techniques generally suffer from the problem of access to the descrambled image for subsequent recording. Typical scrambling techniques capable of being recorded are described below. In each of these techniques significant video processing is required.

A very simple technique of video scrambling of a recorded signal is taught by Perrett in U.S. Pat. No. 4,030,128 ('128) issued Jun. 14, 1977, and incorporated by reference herein. The '128 patent discloses the concept of modifying the normal recording format such that the "control track" and one "audio track" are reversed. See FIG. 2. When such a recording is played back on a normal machine the audio signal would be connected to the control track circuitry in the playback machine. As is well known in the art of video recording, the control track of a helical scan recording provides the control of the tape and rotating head drum speeds to provide a synchronized playback of the recording. Without such a proper control signal the playback signal from the playback recording is generally unviewable. However, the development of the '128 patent was prior to extensive use of pause and still playback in helical scan recorders. Even with the control track reversal a viewer can observe certain graphic images such as charts and fixed material while in the still frame or pause mode. The '128 patent's usefulness generally is limited to the loss of entertainment value perceived in a moving picture and does not prevent a viewer from discerning information on a frame by frame basis. Such a system would have limited usefulness in training or corporate information tapes where information security is important.

Another technique commonly used to obscure the visibility of a video signal is to invert the polarity of the video signal. As is well known in the art of video engineering most video signals use the sync negative concept. As shown in FIG. 1, the synchronizing portion is contained from the blanking level downward. The video level is in the upper portion and an increase in the video signal represents an increase in brightness of the image.

More secure recordable scrambling and descrambling systems are known in the art, but are much more expensive to implement.

One recordable scrambling and descrambling method is described in U.S. Pat. No. 4,916,736 ('736) by John O. Ryan issued on Apr. 10, 1990, incorporated by reference. The '736 patent describes a method and apparatus for time shifting the active portion of video signals towards and away from the line timing reference portion in a pseudo-random fashion prior to recording the signal onto a tape and transmitting it to the user. The signals are descrambled using a reverse time shifting technique. Since the video signal has to be advanced or delayed precisely while maintaining full video quality, the '736 system requires an expensive descrambling process.

Another recordable scrambling and descrambling method is described in a series of patents. These include U.S. Pat. Nos. 5,058,157 issued Oct. 15, 1991, 5,438,620 issued Aug. 1, 1995, 5,579,390 issued Nov. 26, 1996 and 5,581,307 issued Dec. 3, 1996, all incorporated by reference. These patents describe a method and apparatus for time shifting the active portion of the signal relative to the line timing reference similar to the '736 patent and are colloquially known as PhaseKrypt® patents. However, these patents describe several improvements over the '736 patent including improved encoding, less expensive decoding, overlay signals and edge fill techniques. With these improvements, PhaseKrypt encoded video offers dramatic loss of entertainment value but does not produce sufficient concealment to prevent charts and graphs from being read. Further more, when playback is paused there is still less concealment.

It is known in the art to combine a television receiver/monitor and a video cassette recorder to provide a convenient one piece package. Most of these combination packages have a single tuner and no video outputs.

OBJECTS AND SUMMARY OF THE INVENTION

It is an object of this invention to provide an improved method and apparatus for scrambling a recorded color video signal so that a conventional videocassette recorder produces a distorted and generally unviewable picture. Additionally, it is an object of this invention to make a still or pause viewing of graphic or other material unreadable on a television receiver or monitor, when a conventional recorder in playback mode plays back the scrambled signal.

It is a further object of this invention to modify a videocassette recorder's recording system so as to record the scrambled video signal on a tape medium.

It is a further object of this invention to modify a videocassette recorder's playback system to reproduce the scrambled video signal in a descrambled form and in a secure environment for display on only an authorized television receiver monitor.

It is a further object of this invention to incorporate the modified videocassette recorder and the television receiver/monitor into a single self contained package with no external video or audio output connections in order to provide additional security for the descrambled output video and audio.

It is a further object of this invention to provide an authentication system so as to permit playback of videocassettes with scrambled audio and video by only authorized users.

The video/audio scrambling and authorization techniques of the present invention include a combination of several cooperating modifications to standard VHS videocassette recording and playback systems. These include: inverting and re-clamping the luminance video input to the FM modulation system in the recorder; scrambling the audio by either fixed or variable frequency shifting and recording the scrambled audio signal in an audio or a Hi-Fi track; adding a low frequency digital code in the audio channel for authorization purposes; adding video signals, that is, white pulses, in the overscan area of the image to increase the difficulty in reading text and graphic material and inverting the control track and position modulating the normally unused edge in a pseudo-random fashion. A related technique is described in the '128 patent by Perret, where audio is placed on the control track and control signal is place on the audio track. However the audio signal has been shown to be generally inadequately disruptive to the servo system, especially during quiet or silent periods. When playing back on an unmodified unit, the random nature of the audio signal will cause the VCR servo to be unlocked. In an embodiment of the invention, an intentionally generated continuous random signal controls the normally unused edge of the control signal. Since the polarity of the control track is reversed, on an unmodified player, the random edge is read as the control signal and causes the player's servo to be continuously unlocked. A simple chroma scrambling scheme is also described that exchanges the upper and lower side-bands of chroma signal thus producing stable and recordable incorrect color than can only be recovered by a process identical to the scrambling process.

BRIEF DESCRIPTION OF THE DRAWINGS

FIG. 5C is a diagram illustrating a typical line of video, modified by the additions of a white pulse;

FIG. 5D is a diagram illustrating a typical line of video as it may be presented to the display device by an unauthorized player;

FIG. 12 is a block diagram of the audio descrambling circuits of the signal processing means of FIG. 7B, in accordance with the present invention;

FIGS. 13A, 13B are block diagrams of a color scrambling scheme in accordance with the invention;

DETAILED DESCRIPTION OF THE INVENTION

The method and apparatus described below comprises a combination of elements that produce a video signal in a videocassette that is considered scrambled and unusable to the unauthorized user. In general these elements comprise: inversion of the luminance video input to the FM modulation system; inversion and modification of the control track signal; use of the original audio track to carry scrambled audio as well as low rate data for decode authorization and a pilot tone for accurate decoding of the scrambled audio; addition of video signals in the overscan area of the image to increase the difficulty in reading text and graphic material; and combining the authentication, video and audio modification circuitry, modified videocassette recorder and monitor receiver into one self contained "combo" VCR/TV package with no audio or video output jacks.

Figure 14:
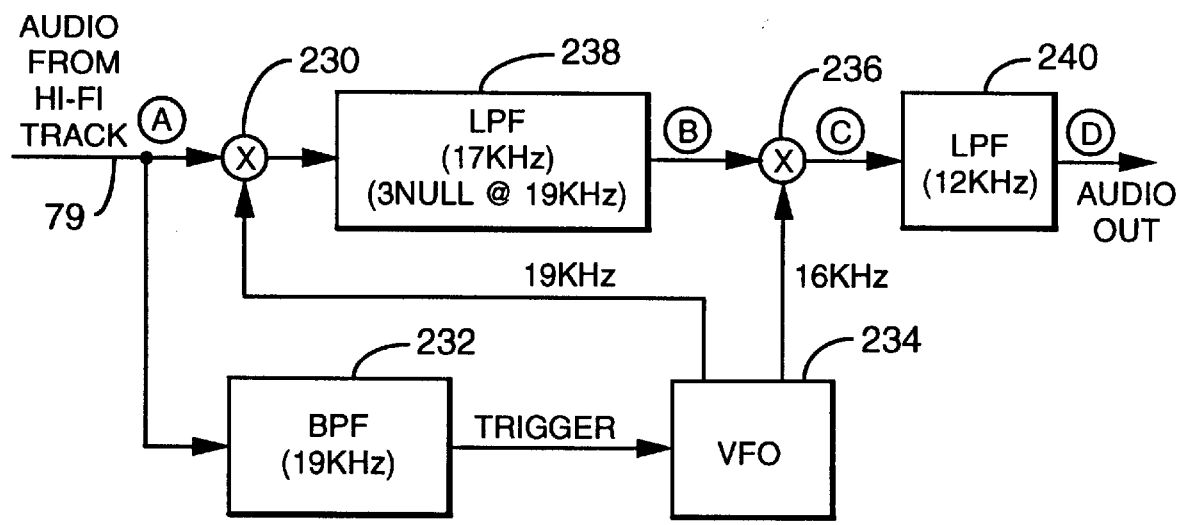
FIG. 14 is a block diagram of the audio descrambler for Hi-Fi track audio recording in accordance with the invention.

The '128 patent by Perret teaches the concept of control track and audio track reversal in relationship to a Sony VO-1600 videocassette recorder (VCR) a very popular helical scan recorder at the time of filing of the '128 patent. Since then videocassette recorders have used many of the same principles employed in the VO-1600 recorder. However, one key improvement is the addition of the so called Hi-Fi audio system. Many videocassette recorders presently use this Hi-Fi audio system which includes additional heads on the video head wheel. An alternative embodiment of the present invention could place the scrambled audio information on a Hi-Fi track, the authorization data on the track recorded normally by the linear audio head and then a completely and intentionally false signal could be recorded by the control track head. The block diagram for the descrambler for this embodiment is shown in FIG. 14. Alternatively, as described in '128 patent by Perret, the control track information could be recorded on the linear audio track by way of the linear audio head and then in this case the authorization data and audio pilot tone, if required, could be recorded by the control track head on the tape in the place normally occupied by the control track information.

Figure 1:
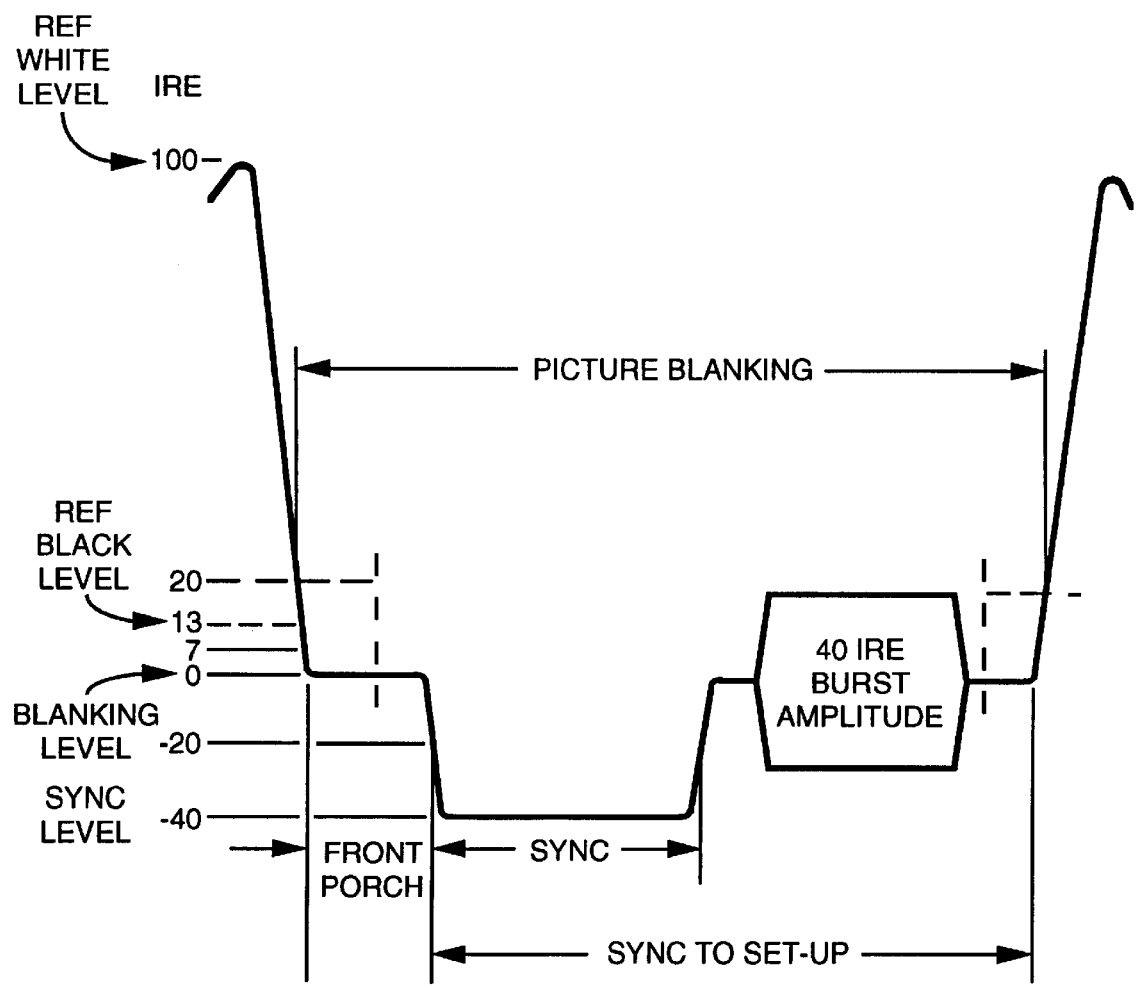
FIG. 1 is a diagram illustrating a typical video waveform.
Figure 2:
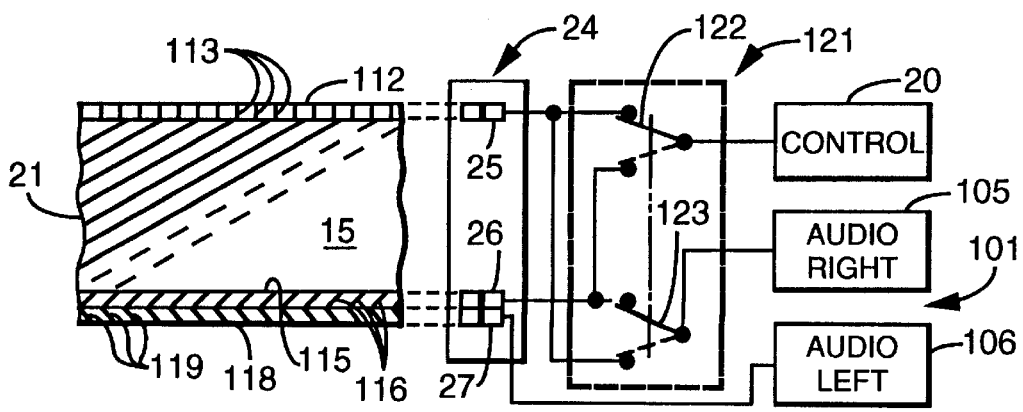
FIG. 2 is a block diagram depicting the technique of reversal of the control track and an audio track, as described in the '128 patent by Perrett.

In order to mask the picture material during the still and pause modes and to improve the security of the playback video during the play mode, additional coacting elements are included. These elements concern the parameters of the typical video waveform, depicted in FIG. 1. The first is to invert the luminance channel video just prior to FM modulation. In the VHS format for example, the sync tip is modulated at a frequency of 3.4 MHz and the peak video is modulated at 4.4 MHz. This inversion would place the normal sync tip information at 4.4 MHz and peak video at 3.4 MHz. The chroma generally is not modified for two reasons: 1) modifying the chroma generally does not improve the scrambling effectiveness and 2) the chroma system in a VCR is complicated and modification of it generally is not worth the complication and generally may detrimentally affect the cost benefit goals of the present invention.

The inversion of the entire luminance signal including sync is quite effective in masking the title and graphic material during a still playback. However, further improvement can be obtained at little cost in fabrication and usefulness of the descrambled picture. Thus, in accordance with the invention, as illustrated in FIG. 3 and FIG. 3A, a second element provides for blanking out certain areas of the image area of the video signal in the so called overscan area of the video picture and replacing the blanked area with certain video pulses.

Figure 3:
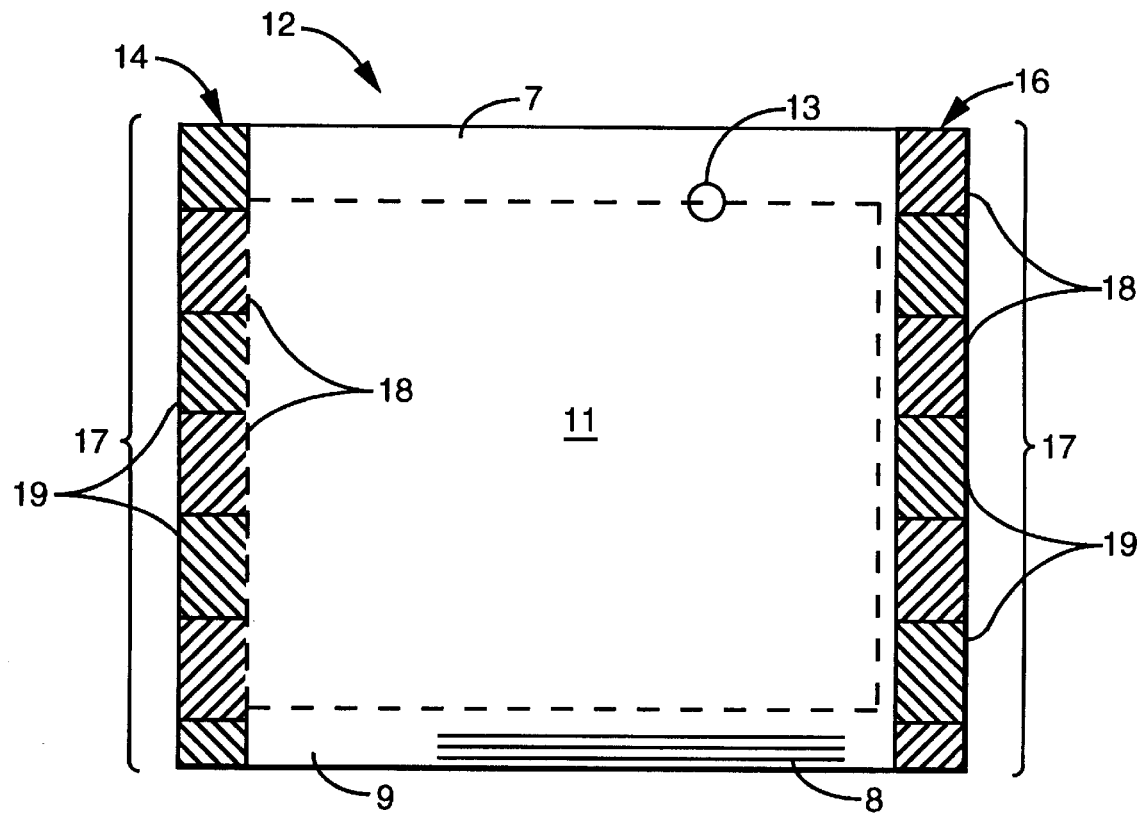
FIG. 3 is a diagram illustrating a technique of adding video pulses to a video signal in the overscan areas of the picture; this Figure describes the video at the output 63 of the processor 62, also at the input to the inverter 142 on FIG. 9 and the lead 75 on FIG. 7B, when an authorized tape is being correctly decoded.

As shown in FIG. 3, in the horizontal modification, the left and right edges of the picture are modified to resemble a "checker" pattern, caused by the addition of white rectangles to the blanked and thus black overscan edges. The width of this checker pattern is chosen to be within the overscan (not viewed) part of the picture when displayed on a standard television receiver. It will be understood that because of the inverted video feature of previous mention, the sync appears as a white signal and peak white appears as sync to the unauthorized playback recorder and receiver/monitor displaying the image. See FIG. 3B. Under these circumstances and in accordance with the invention, the black rectangle in certain video lines will trigger an erroneously timed horizontal retrace, since it appears to be a negative-going (towards blanking level) transition. (The description of video waveforms herein follows the convention of positive amplitude being white and negative amplitude being black, see FIG. 1). In order to add to the confusion seen by the recorder and receiver circuitry, the checker pattern is added to both sides of the picture and the white and black portions are opposite as shown in FIG. 3, before inversion and modulation. Additionally the position of the respective pulses change from field-to-field to create a field-to-field dynamic shift that makes reading text and graphics while under motion even more difficult.

In an alternative horizontal modification, the rectangular white and black block pattern is generated at a rate slightly asynchronous to the video field repetition rate, so that the checker pattern appears to slowly move up or down the picture, at a rate, for example, of about 1 second for any given point to migrate from the bottom to the top of the picture or vice versa.

The pattern has no effect on the picture when an authorized cassette is replayed since no signal conditions are present in the display device which are in any way abnormal. In order to eliminate any possible visibility of the pulses corresponding to the checker pattern in the descrambled video signal during playback, a further embodiment includes a blanking circuit to blank out the checker pattern pulses, that is, the white pulses, on playback on an authorized recorder/receiver combination.

However, when an encoded cassette is replayed using an unmodified or a modified but unauthorized videotape player, the luminance channel 1 inversion feature in combination with the checker pattern feature causes the television set's horizontal retrace to occur at the wrong time. The retrace time will depend on the picture content and the characteristics of the videotape recorder and display device. The white rectangles each may cause a transition of sufficient amplitude depending on the previous active video picture content.

The synchronizing pulse separator in a typical television set or monitor is designed to output a signal that corresponds to the most black information in the received signal. The design of the circuit that performs this separation generally includes some circuitry for DC restoration with a time constant that is optimized for the correct detection of standard television signals. The before-mentioned white rectangular pulses that are added to the encoded signal are designed to appear similar to the synchronizing part of a standard television signal, such that pulses will be generated which correspond to said white rectangular pulses when an unauthorized player produces inverted video when playing an encoded tape. However, in order to increase the random nature of the horizontal displacement it is desirable that white excursions of picture content also contribute to the erroneous output of the synchronizing pulse separator. Thus the added white rectangular pulses can be set to an amplitude that does not prevent picture content from being detected by the synchronizing pulse separator. Said white rectangular pulses may also vary in amplitude with time.

A somewhat similar modification in the vertical picture sense, employs the addition of white lines in place of active video in the last few lines of selected video fields in the lower overscan portion of the picture just prior to the vertical blanking interval, and/or extending into the first few lines of the vertical blanking interval.

This vertical rate modification is implemented in several ways. In one embodiment several of the active video lines (five or so) immediately prior to the vertical sync signal are made to alternate between a white level and a lesser level at a rate of about 1 to 5 cycles per second. This can cause erroneous vertical retrace in a TV set, causing the picture from the unauthorized playback to exhibit vertical instability (jump up and down) at that particular rate, subsequently degrading the quality of the image.

In another version, two to five lines of alternating (modulated) white-black-white rectangles are inserted at the end of each or alternate video fields, with the same result of loss of vertical lock in a viewing TV set, due to interpretation of the inserted pattern as a vertical sync signal when the video luminance signal has been inverted as described above.

These vertical modifications in another version are both extended into the first few lines of the subsequent vertical blanking interval.

Addition of pulses to portions of the video signal after normal horizontal or vertical synchronization pulses cause an abnormal video retrace at this point, thereby being an effective enhancement to the scrambling process. Typically these added post-vertical synchronization pulses are at, for example, lines 22–24 of an NTSC television signal.

Thus, the processes in accordance with the invention ensure optimum conditions in terms of picture content for causing the maximum level of subjective degradation to the unauthorized playback of an encoded cassette.

That is, an unmodified or modified but unauthorized player will produce video signals that will cause a display device to erroneously perform the horizontal or vertical retrace at an abnormal point in response to the horizontal and vertical modifications of the present invention. In the same way that said display device will misinterpret the signal, an unauthorized recording videotape recorder in which a copy is being made also will be abnormally affected.

Provision of the horizontal white rectangle pattern or of the vertical modification in only the overscan portions of the television picture ensures that when the encoded cassette is played in an authorized player there is no visibility of the checker pattern or of the vertical modification. Indeed the viewer of the authorized playback is completely unaware of the presence of the horizontal or vertical modification.

Horizontal Rate Signal Modification

FIG. 3 illustrates a television picture 12 of the present invention including horizontal modifications, that is, including left and right overscan portions 14, 16. Vertical modifications also are shown in the picture 12 as white lines 8 in a bottom overscan portion 9. A top overscan portion is depicted at 7. The part of the picture inside the dashed line 13 is the visible video 11.

In the left and right overscan portions 14, 16, a checker pattern 17 of alternating white rectangles 18 and black rectangles 19 is provided. The checker pattern information derived from the rectangles 18, 19 provides concealment (tearing) enhancement as described below. In the display of the picture 12 on a display device, the checker pattern 17 would not be seen since it is in overscan portion 16. The vertical signal modification is inserted in the bottom overscan portion 9 and therefore also is not visible.

Figure 5:
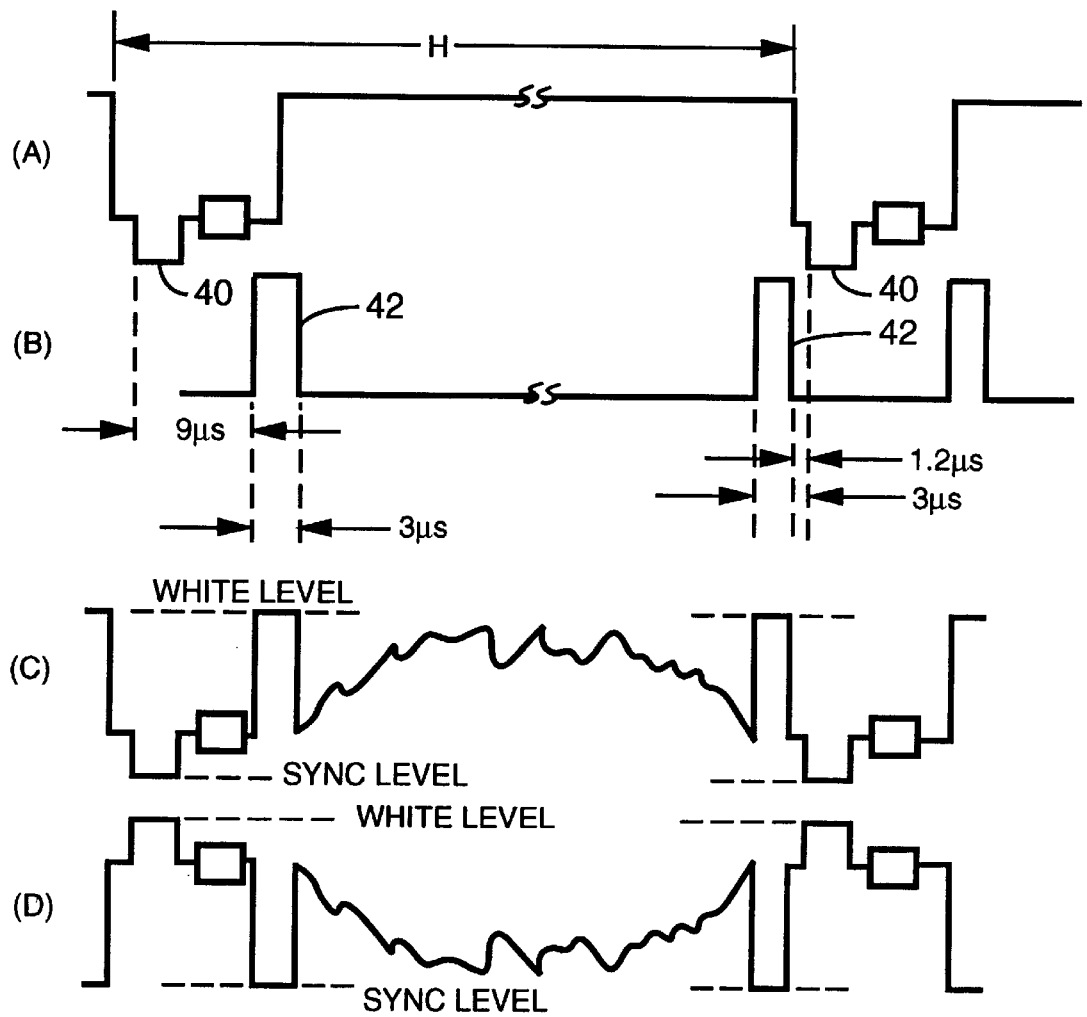
FIGS. 5A–5D and 6A–6B are diagrams illustrating the addition of white pulses to the horizontal video waveform and white lines to the bottom of the vertical video waveform, respectively.
Figure 6:
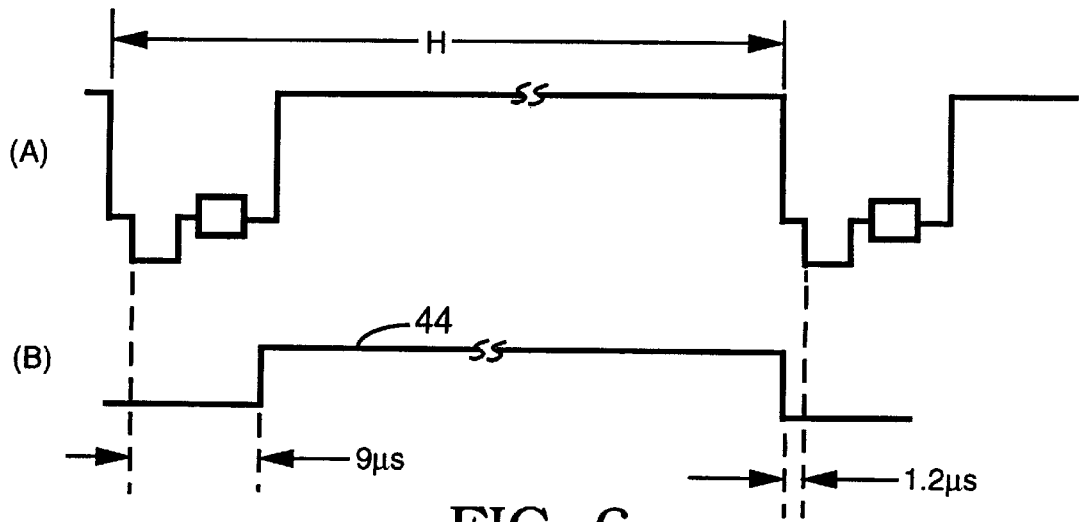

In accordance with the invention, the "checkered" pattern of FIG. 3, item 17 may include typically five to fifteen white rectangles 18 interleaved with five to fifteen black rectangles FIG. 3, item 19. (Fewer such rectangles are shown in FIG. 3 for clarity). Other white rectangle patterns are possible. Examples are described below in FIGS. 5, 6 and the chart.

The signal level of the black rectangles 19 may be set around black level for example for NTSC or PAL or SECAM and the amplitude of the white rectangles 18 is approximately 100% of peak white level. The checker pattern 17 induces a zigzag type pattern. In other embodiments, there might be only one white rectangle 18 or two, three or four or more white rectangles 18 per field of FIG. 3. Also the sizes (heights and widths) of the white rectangles 18 and/or black rectangles 19 need not be uniform.

The checker pattern 17 shown in FIG. 3 is one such pattern which causes the intended effect. The white checker appears to be a false sync to an unmodified videocassette recorder/receiver combination playing back a scrambled videocassette containing the inverted video. The addition of the checker pattern exacerbates the errors created by the inverted video.

FIGS. 5A–5D illustrate an alternate pattern of the timing and thus positions of the white rectangles 18 previously shown and discussed relative to FIG. 3, which are added to the video signal in the overscan portions 14, 16 at the beginning and/or end of the active video picture 11 (FIG. 3). In particular, a conventional active line of video of one horizontal line period, H, is shown in FIG. 5A, with a horizontal sync pulse 40 on either end. FIG. 5B shows the timing of a white pulse 42 corresponding to the white rectangle 18 (FIG. 3) that is applied to the particular line. As depicted, the white pulse 42 at the beginning of the line may be of the order of 3 microseconds (μs) in width and begins before and ends after the start of the line. The white pulse 42 added at the end of a line is depicted of the order of 1.8 μs in width and begins 1.8 μs before the end of the active video line and thus ends coincidentally with the end of the line. Since the transient response of a VCR is poor, a white pulse which extends beyond the line tends to bleed down into the sync pulse. As may be seen the white pulses 42 at the beginning and end of the selected lines are not necessarily symmetrical. Further, the bleeding may also be alleviated by delaying the first edge of sync in the pre-processing unit. Any effects resulting from the changed relative position of leading edge of horizontal sync pulse and the color burst can be corrected by a corresponding relocation and/or expansion of the color burst. Although the white pulses 42 are shown herein on the same line for ease of description, as previously discussed in FIG. 3 the white pulses are alternated down selected series of lines on the left and right (beginning and end) overscan portions 14, 16 so that lines beginning with a white pulse 42 will end with a black pulse (that is, without a white pulse) and vice versa. In addition, white rectangles 18, that is, white pulses 42, are alternately added to corresponding series of lines on even and odd fields, as discussed relative to FIG. 3.

FIG. 5C further illustrates a typical line of video such as the line shown in FIG. 5A, but which is modified by the additions of white pulses such as pulses 42 of FIG. 5B. A white pulse may be added at the beginning of the active video, at the end of the active video or, as described above, may be added at the beginning and end of alternate lines of video. FIG. 5D illustrates a typical line of video which has been inverted in accordance with the invention and which is presented to a display device such as a TV set by an unauthorized player apparatus.

By way of clarification, the following chart illustrates by way of example only a timing pattern for the addition of white pulses 42 to the beginning and end of successive lines of even and odd fields of video.

CHART

Even Field (a) White pulses start on line 22 on left side for 4 lines (22, 23, 24, 25)
(b) Then white pulses are on right side only on lines (26, 27, 28, 29)
(c) Lines 30, 31, 32, 33, 34, 35, 36, 37 have no white pulses
(d) Lines 38, 39, 40, 41 have white pulses on left
(e) Lines 42, 43, 44, 45 have white pulses on right
(f) Lines 46–53 have no white pulses
  Etc- Odd Field (a) White pulses start on line 293 on left side for 4 lines (296, 297, 298, 299)

The white pulses are on the right side only on lines 300–303. The pattern then continues as described in the even field. The last white pulses on each field are on or before the last active line.

In the next even and odd fields, the positions of the alternate white and black rectangles are reversed such that the positions of white pulses in lines of even and odd fields in one frame alternate with the positions of white pulses in the even and odd fields of a next frame. Such continuously alternating positioning of white pulses enhances the scrambling effects of the invention.

Thus the typical duration, (width) of the white rectangle 18 may be approximately 1.0 to 3.0 microseconds, as determined by the requirement that the checker pattern normally is not introduced into the displayed portion of a standard television picture, i.e. is limited to the overscan portion, and also does not infringe upon the normal horizontal blanking period.

In other embodiments, the horizontal sync pulse may be narrowed which allows the checker pattern to be made wider. This provides a greater reliability of false sync detection when the scrambled video signal is displayed. Also, the particular amplitudes of the white 18 and/or black 19 rectangles need not be exactly as described above.

Vertical Rate Signal Modification

The above detailed description is directed to horizontal picture information, wherein the video signal modification and the consequent effect of this modification are in the horizontal picture direction. The related vertical rate modification of previous mention in the Summary is further described hereinafter.

In one embodiment, video on lines before and after the normal vertical blanking interval may be removed and replaced by intermittent white pulses that cause vertical retrace to occur before or after the time that a normal vertical synchronizing pulse would dictate. For example, in a field where white pulses are inserted in the place of normal video starting on line 260 on a number of consecutive fields, and then on another number of consecutive fields video is replaced by white pulses starting on line 17, there could be a potential vertical jitter of about 20 lines. The rate of this jitter is set by the rate of alternating between pre and post vertical blanking interval white pulses and it may vary between 1 Hz and 10 Hz or be random within this range for example. There may also be periods when both sets of pulses are active. These vertical modifications are normally not visible to the viewer since the modified active video lines are restricted to those lines falling in the overscan area 9 at the bottom of the picture of FIG. 3. Also, the modified lines will be in a similar location to the head switch point when video from a VCR is considered, and video on these lines is unusable in any case as a result of disturbances occurring at and after the head switch point.

FIGS. 6A–6B illustrate a preferred embodiment of the timing and positions of the white lines 8 in the bottom overscan portion 9, previously mentioned relative to FIG. 3. In particular, a plurality of active video lines in the bottom overscan portion 9 have a white pulse 44 (FIG. 6B) of almost line period inserted therein, resulting in the generation of a white bar in the overscan portion 9. The number of lines may be four, for example, and the white pulses 44 corresponding to the lines 8 (FIG. 3) are inserted in one field and then skipped for several fields, for example, 3, 4, 5 fields etc.

It is to be understood that the vertical modification need not extend over the entire active video portion of a horizontal line. It has been found that providing the modification over about ½ of the duration of active video in a line is sufficient to generate the premature vertical retrace.

The vertical modifications to the video signal have no effect when applied to a display device as a part of an authorized descrambled signal.

In other words, the vertical rate waveform modifications function similarly to the horizontal rate waveform modification described above, except that disturbances are induced in the vertical direction rather than in the horizontal directions. The two techniques combined are more effective in terms of picture quality degradation than either one on its own. Sweeping the pulse rate of the vertical waveforms increases effectiveness to more display devices, i.e., the frequency is varied between for instance 2 Hz and 10 Hz over a period of about 20 seconds. Sweeping the checker frequencies also will cause the horizontal tearing to move up and down resulting in a more irritating picture when an unauthorized viewing is attempted.

Alternative Coacting Modifications

As discussed above, in an alternative embodiment the control and audio tracks may be reversed in the record process. The original control track then is available for other functions, since the audio could be recorded only on the Hi-Fi tracks. Among the signals that may be recorded on the "original" control track is a signal of about 30 Hz that is phase, frequency, quadrature, pulse width, pulse position and/or amplitude modulated such that, when played back on an unauthorized videocassette recorder, the control servos are forced to create tracking problems via this pseudo control track signal. This pseudo control track signal also may be a multiple of frequencies, or a wide deviation in frequency, for example, 15 Hz to 45 Hz, or may be a pseudo random signal as well. Any of these approaches is likely to produce sufficient mistracking to create an unwatchable picture and mute the program audio recorded on the audio Hi-Fi tracks. This creates a form of audio concealment.

However, even with the mistracking, portions of the Hi-Fi audio may be discernible to an unauthorized listener with an unauthorized and unmodified playback device. Since much of the important and sensitive information in a training and corporate communications environment is contained in the audio portion of a recording, a simplified audio scrambling and descrambling technique is added to increase the security of the recording.

Examples of the audio scrambling and descrambling techniques which may be used are described in two patents. These are U.S. Pat. Nos. 5,095,279 ('279) issued Mar. 10, 1992 to Quan et al. and 5,471,531 ('531) issued Nov. 28, 1995 to Quan, both incorporated by reference. To this end, an additional carrier "trigger" signal is added to any one of the linear audio or control tracks to facilitate proper audio descrambling. The additional trigger signal is an AM or FSK signal of a frequency of about 1000 Hz or higher (preferable 5000 Hz or higher) which will trigger the audio scrambling carrier frequency generator in a manner similar to that disclosed in the '279 patent. The variable scrambling carrier frequency generator then is used to modulate an inverted or shifted audio spectrum that is recorded on the videocassette recorder's audio tracks.

Additional scrambling affects can be achieved by reversing the direction of recording and playback by the video recording and playback heads. Thus an unauthorized recorder playing back the recording would display a mirror image of the signal, adding to the unwatchable character of the playback. Graphics and title material would be a little more difficult to read. This method of scrambling in combination with the other methods described above would add to the difficulty in viewing the unauthorized recording.

In addition to the audio scrambling, reversing of the audio head connections provides an additional method of masking the original information content of a recording when played back by an unauthorized listener.

Accordingly it is to be understood that the scrambling techniques of previous description acting in combination make it that much harder for an unauthorized user to gain access to the information. However, if the descrambling portion were included only in a videocassette recorder with descrambled audio and video outputs, an unauthorized person still could easily copy the descrambled output of the videocassette recorder onto a tape within a second videocassette recorder. One effective way to prevent this is to incorporate all of the descrambling circuitry, the playback videocassette recorder and the monitor receiver within a self contained package with no audio or video output jacks. Such a modification herein is referred to as a "combo" VCR/TV unit, which also includes the display device and amplifier/speaker means of FIG. 7B.

Figure 4:
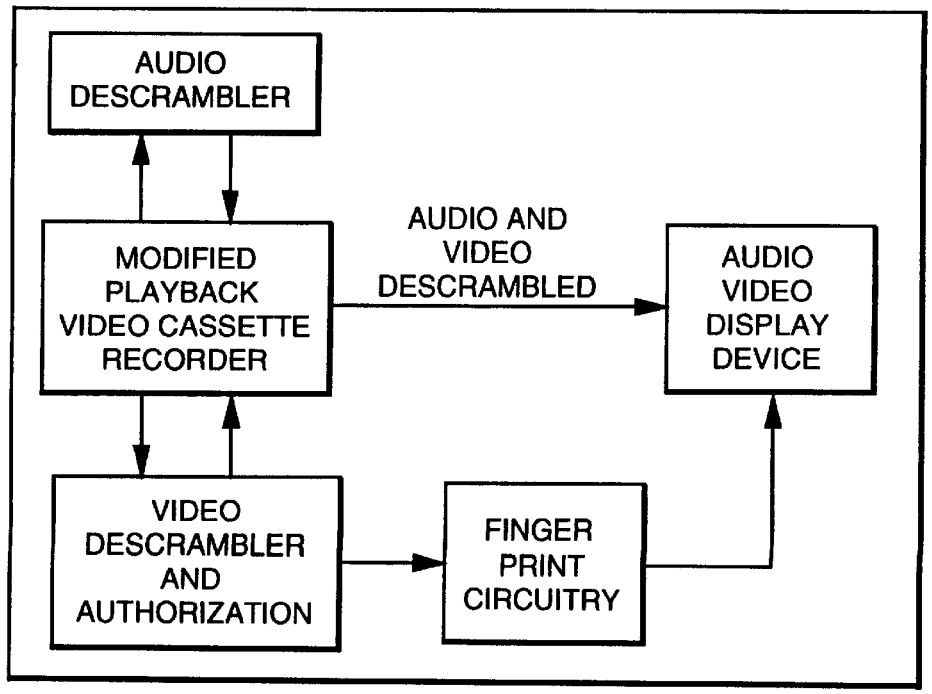
FIG. 4 is a block diagram illustrating a combination of descrambling circuitry, a modified videocassette recorder and a television monitor/receiver installed in one self contained unit.

A determined unauthorized user may attempt to copy the unscrambled audio and video by using a camcorder device to view and listen to the playback output of the descrambled audio and video. There are ways to discourage an unauthorized use of such a screen recording technique to copy the program. One way is to use the techniques of video fingerprinting described in U.S. patent application Ser. No. 08/294,983 ('983) by Copeland filed on Aug. 24, 1994 entitled A Video Finger Print Method and Apparatus, incorporated herein by reference. The fingerprint signal described in the application Ser. No. 08/294,983 is encoded to include playback location information, date of playback, time of playback and other information useful to an owner of the scrambled video tape. As described in the application, the fingerprint code is not visible to a viewer, but can be detected by a recording camera. If an unauthorized monitor recording were retrieved, it would be possible to know when and where the recording took place. In a training or corporate environment, it is probable that the authorized owner of the scrambled tape would know who had access to the modified playback device and scrambled tapes at the time and place of the recording. The authorization code on the pseudo control track may be part of the fingerprint signal. In this way, there can be an additional correlation between the specific program and the location, time and date information discussed above. The actual fingerprint signal would be generated within the integrated playback display device. See, for example, FIG. 4, and the description in the patent application Ser. No. 08/294,983.

The FIGS. 7–13 illustrate by way of example only, circuits which may be employed in a preferred embodiment to achieve the objects and advantages of the invention set forth hereinbefore.

Figure 7A:
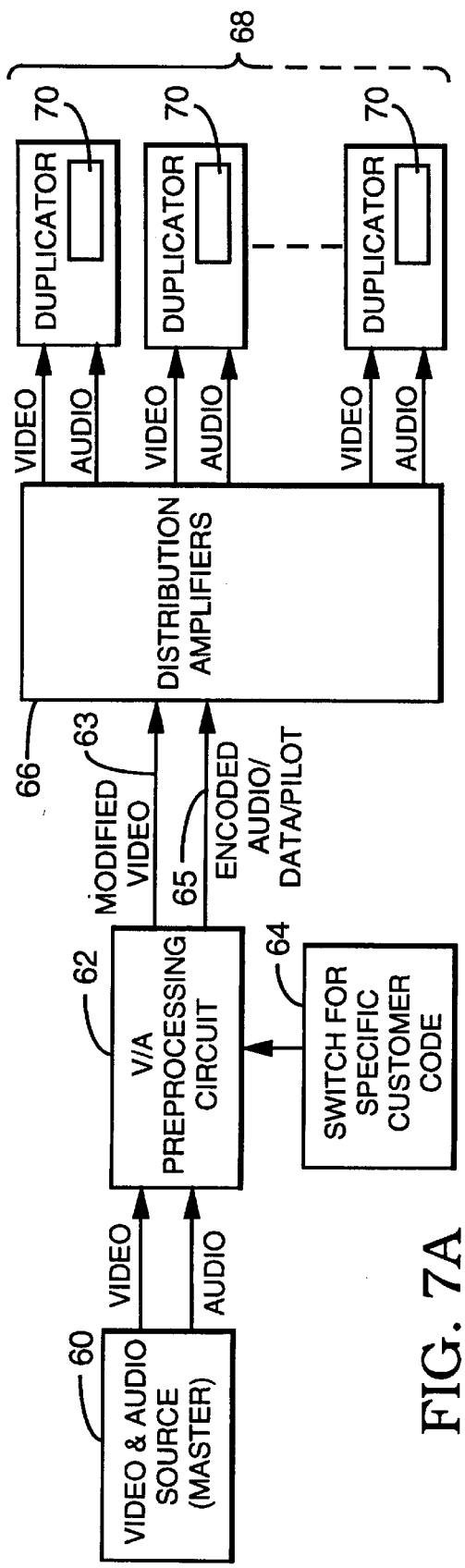
FIGS. 7A and 7B are block diagrams illustrating, in part functionally, the scrambling and descrambling apparatus of the present invention.
Figure 7B:
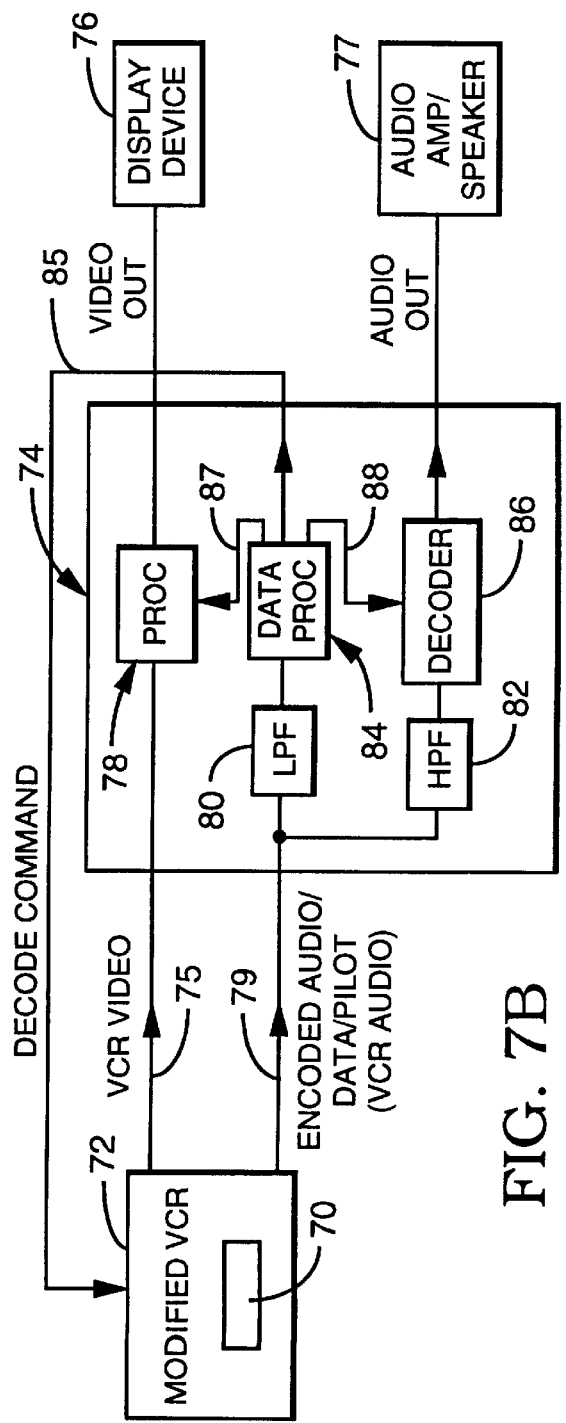

To this end, FIGS. 7A and 7B illustrate in general the audio and video data paths for scrambling and descrambling circuits, respectively, in accordance with the invention. Referring first to FIG. 7A, a video/audio source 60 comprises a source of master video and audio signals such as, for example, a video/audio player apparatus, a camera/live video/audio means, etc. The master video and audio signals are supplied to a video/audio preprocessing circuit 62 which processes both signals in accordance with the invention. More particularly, the video signal is modified by selectively blanking the signal in the overscan portions and then adding the white pulses 42 and 44 in the blanked overscan portions, as discussed in FIGS. 3, 5 and 6. The audio signal is modified by a specific customer authorization code which is embedded in the box containing the circuit 62 so that the customer has no access to the code to prevent inadvertent or purposeful breaches of security. In addition, the audio signal is scrambled by a fixed or variable frequency shifting process. A selected pilot tone also is added to the audio signal (FIG. 8B), whereby any variations in phase and frequency introduced by the recording or playback processes are tracked by the pilot tone, which is used to correct the variations. For example the pilot tone allows compensation to be made for the magnified wow and flutter in the descrambled audio. See U.S. Pat. Nos. 5,058,159 and 5,095,279 of previous mention. A switch 64 is provided external of the circuit 62 which provides the manufacturer of the scrambled video/audio material with means for inserting the preselected authorization code specific to a customer into the audio signal. Switch 64 also provides a customer with means for adding customer specific data to the signal such as for example the number of the tape, the date, etc.

The modified video signal and the encoded audio signal with added data, that is, authorization code and the pilot tone, are supplied via respective leads 63 and 65 to standard distribution amplifiers 66. At this stage, the video signal advantageously is not scrambled and may be successfully viewed on a standard monitor and passed by the standard distribution amplifiers 66. The modified video/audio signals are supplied to a plurality of duplicators 68 (for example, 20) which provide multiple copies of the modified signals on, for example, video cassettes 70. The duplicators 68 are modified with added electronic circuits in accordance with the present invention to apply a luminance channel inversion process and a control signal inversion process, which together with the added white pulses provides scrambled video/audio signals which cannot be successfully played back by an unauthorized viewer.

The preprocessing circuit 62 and the duplicators 68 and their functions are more fully described in FIGS. 8A–8C and 9, respectively, which follow further below.

Referring to FIG. 7B, there is illustrated a data path of descrambling apparatus for descrambling the video/audio signal recorded in, and recovered from, the cassette 70, but only if the authorization code specific to the descrambling apparatus matches the code added to the signals in the cassette. To this end, the cassette 70 is loaded into a VCR 72 modified in accordance with the present invention to include the VCR, a signal processing means 74 and video/audio monitors 76 and 77 combined in a single unit, herein referred to as a combination VCR/TV playback unit, or "combo". A plurality of combos are supplied to each specific customer for distribution by the customer to various subsidiary personnel authorized to receive and use the video/audio material on the cassettes 70. The modified VCR 72 is provided with circuits which enable partially descrambling the modified video signal on the cassette 70, that is, that provide re-inversion of the luminance channel and of the control track signal. A proper video signal which at this stage only contains the white pulses, is supplied to the signal processing means generally indicated with the number 74 and, in particular, to a signal processor circuit 78 which removes the white pulses 42, 44 and supplies the descrambled video signal to the display device 76 if authorized.

The encoded audio signal with added authorization data and pilot tone is supplied from the audio track via a lead 79 from the VCR 72 to a low pass filter (LPF) 80 and a high pass filter (HPF) 82 in the processing means 74. The low passed audio signal containing the authorization data, that is, code, is supplied to a data processor circuit 84 which provides control signals which relate to the authorizing/unauthorizing procedure. One of the control signals is a decode command which is supplied via a lead 85 to the VCR 72 to allow the partial descrambling of the played back video signal if the authorization code is correct. Other control signals are supplied via leads 87 to the video signal processor circuit 78 to process and to allow or prevent the displaying of the video signal on the display device 76. The data processor circuit 84 also supplies an audio mute/decode/clear signal via a lead 88 to an audio decoder circuit 86, which receives the high passed audio signal from the HPF 82 and which supplies the decoded audio signal to an audio amplifier/speaker means, that is, the audio monitor 77, only when authorized.

The modified VCR 72 and the signal processing means 74 and their functions are more fully described with reference to FIGS. 10 and 11, 12, respectively, which follow further below.

Figure 8A:
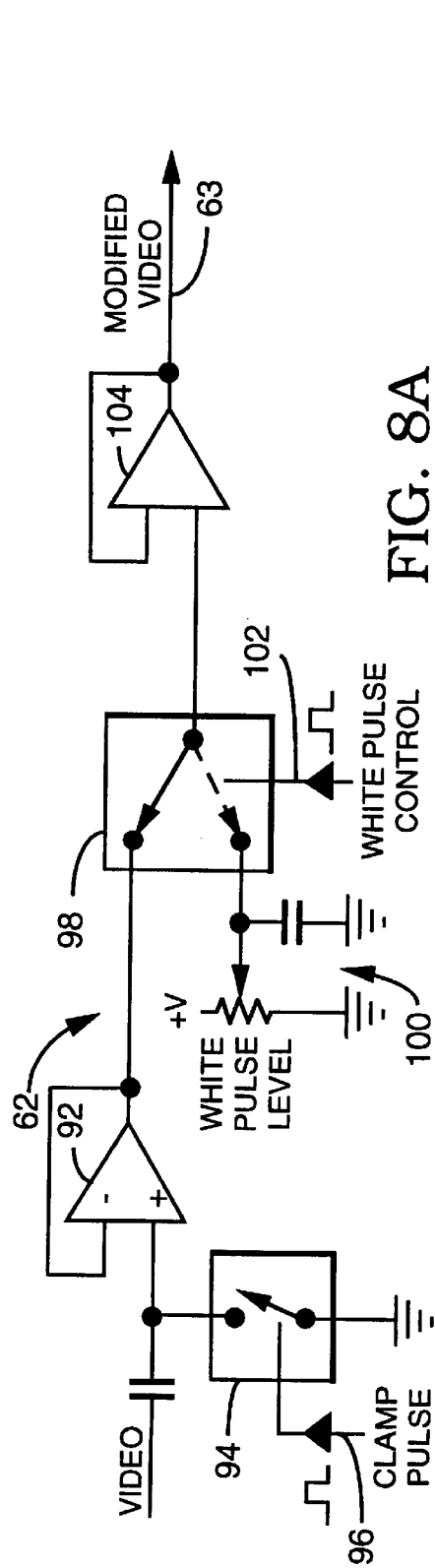
FIGS. 8A and 8B are schematic block diagrams illustrating in further detail the video and audio circuitry, respectively, of the preprocessor circuit of FIG. 7A.
Figure 8B:
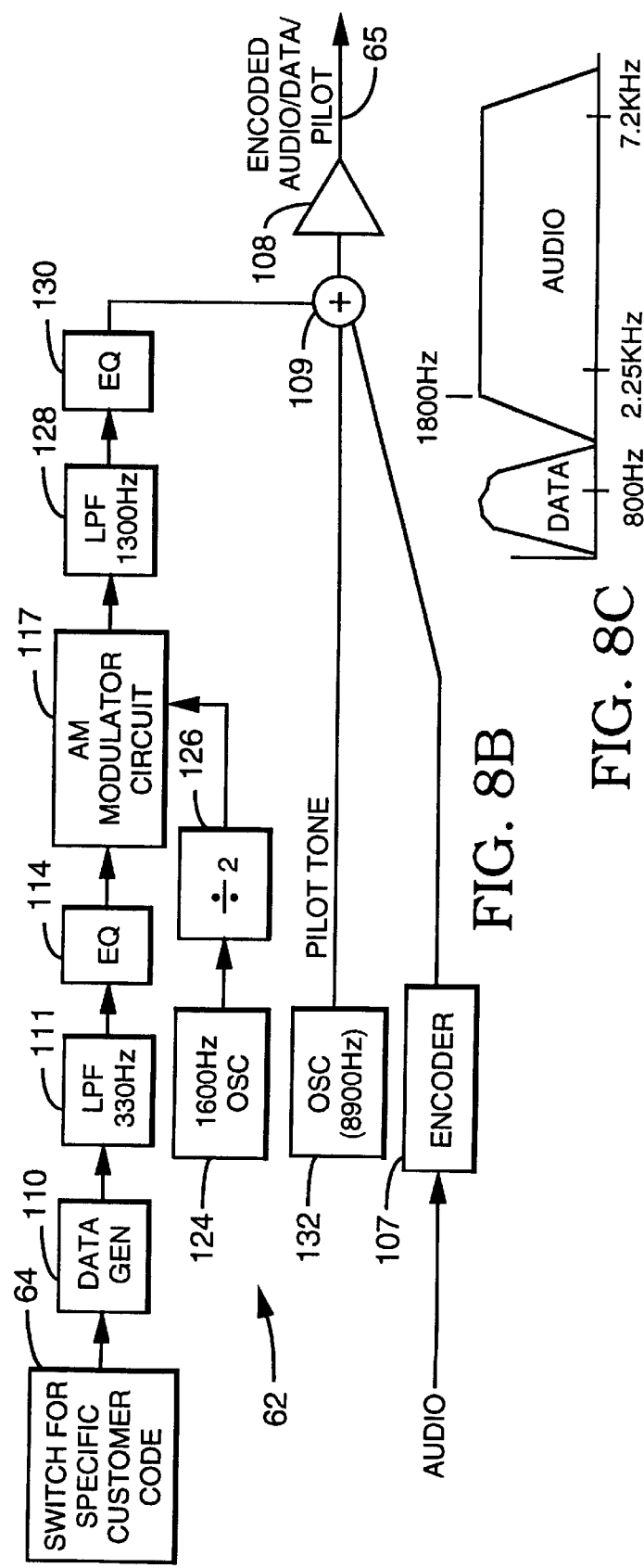
Figure 8C:
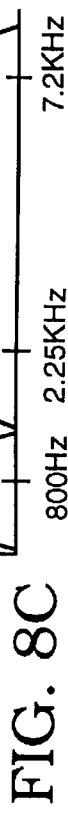
FIG. 8C is a diagram illustrating the frequency spectrum of the scrambled audio signal in accordance with the invention.

FIGS. 8A and 8B illustrate in further detail video and audio circuitry, respectively, of the video/audio preprocessing circuit 62 of FIG. 7A. In FIG. 8A, the video signal is AC coupled to a buffer circuit 92, and also is clamped to ground by a switch 94 controlled by a clamp pulse on a lead 96. The buffered video signal is supplied to one input of a video white pulse switch 98. A second input of switch 98 is coupled to a white pulse source 100 formed for example of a voltage source, adjustable resistance and a capacitor to ground. A timing control signal for enabling the insertion of the white pulses from the source 100 into the video signal stream is coupled to the white pulse switch 98 via a lead 102. The video signal modified with the white pulses (42, 44 of FIGS. 3, 5, 6) is buffered at 104 and is supplied on the lead 63 as the modified video to the distribution amplifiers 66 as previously shown in FIG. 7A.

FIG. 8B illustrates circuits for scrambling the audio signal and for adding authorization code/data assigned to a specific customer and the pilot tone to the audio signal. To this end, the audio signal derived from the video/audio source 60 of FIG. 7A, is supplied to an encoder formed of a frequency spectrum shifting circuit 107 such as disclosed in U.S. Pat. No. 5,471,531. The encoder 107 performs the function illustrated in FIG. 8C, namely, shifting the audio frequencies up into a higher spectrum thereby freeing up the lower frequency baseband portion of the spectrum. The frequency shifted audio signal then is supplied to an amplifier 108 via a summing junction 109.

The previously mentioned switch 64 for inserting a customer specific code is depicted coupled to a data generator 110 which generates the selected code as well as any added customer data. The resulting data signal corresponding to the authorization code for a specific customer along with any added data, is supplied to a low pass filter (LPF) 111 and is low passed to, for example, 330 Hz. The data may comprise, by way of example only, a 16 bit authorization code which may be followed by another 8 bits, termed "user bits", which can be used by a customer as previously described in FIG. 7A to add other customer specific information such as the number of the cassette, the date, etc. The data is equalized in an equalizer circuit 114 and is supplied to an AM modulator circuit 117. An oscillator 124 generates, in this example, a 1.6 kHz signal which is divided-down by two in a divider 126 to insure a square wave carrier signal of for example 800 Hz. The data is modulated by the 800 Hz carrier in the modulator circuit 117. The AM modulated data is put through a second LPF 128 and an optional phase equalizer circuit 130 to insure that the data is compatible with the audio signal. The resulting data then is mixed with the audio signal via the summing junction 109 to insert the lower frequency data spectrum illustrated in the FIG. 8C.

An oscillator 132 of, for example, 8.9 kHz is provided as depicted to supply the previously mentioned pilot tone of 8.9 kHz, to the summing junction 109. The combined audio signal with authorization code and pilot tone is supplied via the amplifier 108 and the lead 65 to the distribution amplifier 66, as previously described in FIG. 7A.

Figure 9:
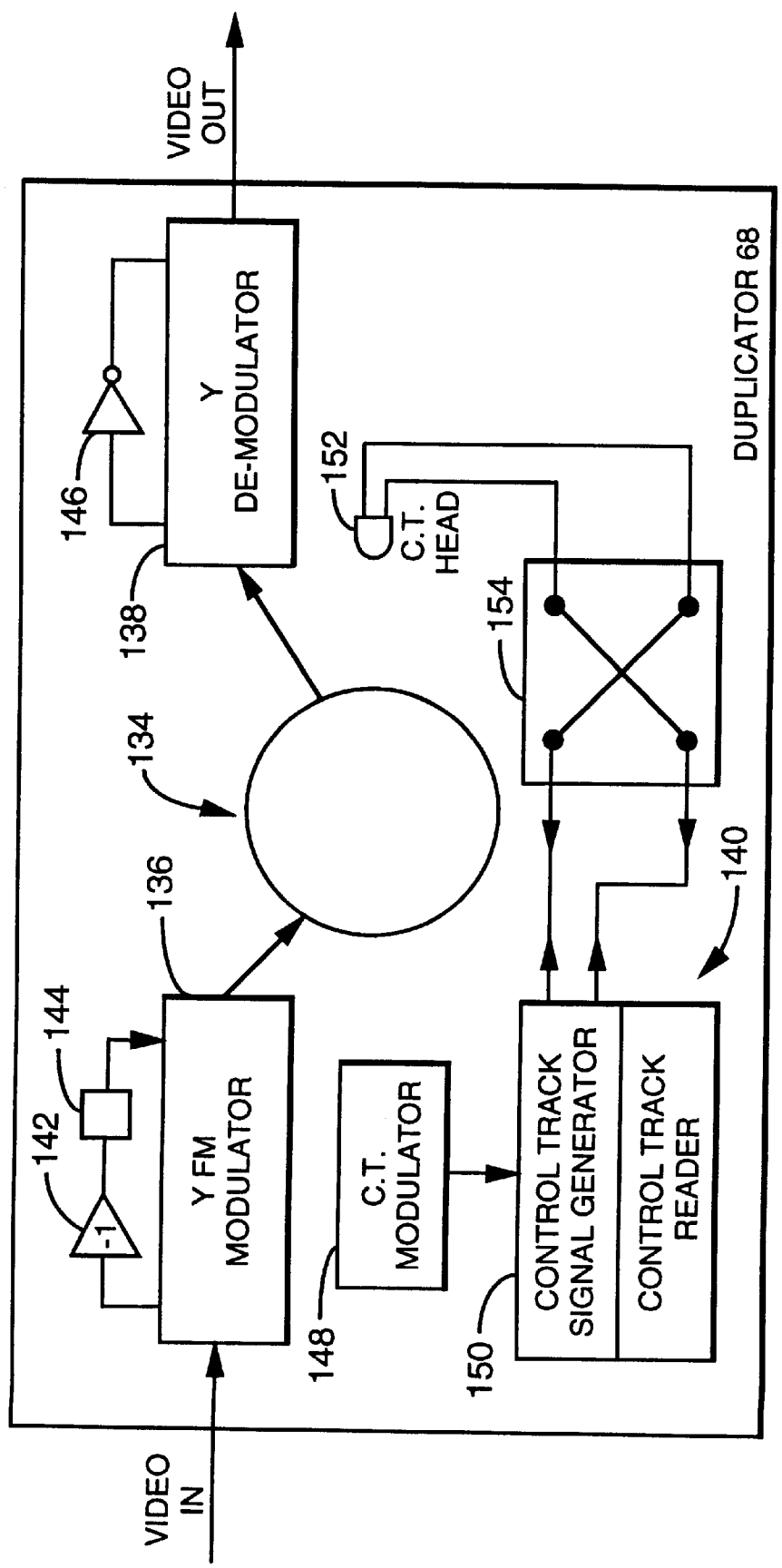
FIG. 9 is a block diagram of a modified duplicator apparatus of FIG. 7A.

FIG. 9 illustrates in further block diagrams, modifications to the duplicators 68 of FIG. 7A in accordance with the present invention. The duplicators 68 include conventional VCR recorder/player mechanisms and circuits generally represented in FIG. 9 by a helical scan drum symbol 134. Also included are luminance FM modulator and demodulator circuits 136 and 138 respectively, and control track recording circuits 140. The modulator and control track recording circuits 136 and 140 are modified in accordance with the present invention, while the demodulator circuit 138 is modified to allow playback of the recording on the duplicator 68 for purposes of previewing the recording. To this end, the FM modulator 136 is modified to supply the luminance component of the video signal to an inverter and a clamp circuit 142, 144 respectively. The inverted and re-clamped luminance component is then FM modulated prior to the modified video signal being recorded on the cassettes 70.

The demodulator circuit 138 is modified to include an inverter circuit 146, which is required if the recorded video is to be played back via the duplicator 68 and demodulator circuit 138, for example, to check the quality of the recording. The control track recording circuits 140 are modified to provide a control track modulating circuit 148 coupled to a control track signal generator 150 of the circuits 140, which modulating circuit 148 position modulates the usually unused edge of the control track square wave. The control track signal is "inverted" by reversing the connections to a control track head 152 via a switch 154, whereby the control track pulse edge normally not detected is the edge detected, while the edge normally detected is not. Position modulating the normally unused edge, which now is being used, confuses the control track detection circuits of an unauthorized VCR or other player apparatus, as is intended by the present invention.

Figure 10:
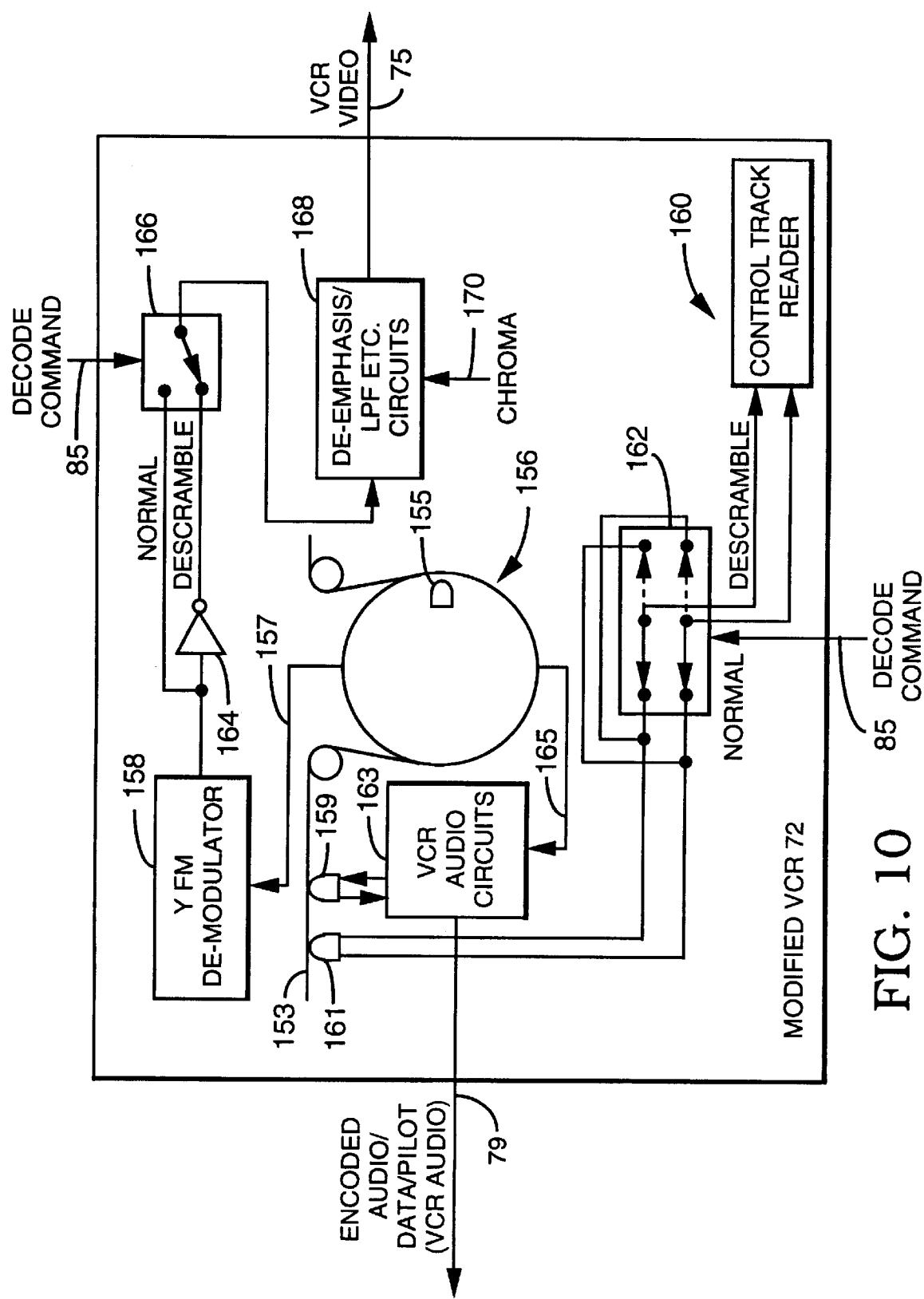
FIG. 10 is a block diagram of a modified playback portion of a tape recorder which is part of the combination VCR/TV unit of the present invention.

FIG. 10 depicts a block diagram of a combination VCR tape recorder/player which is modified to include circuitry for allowing the playback of a scrambled video/audio cassette 70 in the event that the correct authorization code is embedded in the audio signal contained in the cassette. The VCR 72 is part of the "combo" VCR/TV playback unit of previous mention in FIG. 7B. To this end, the modified VCR 72 of FIG. 7B is shown in FIG. 10 in further detail, and includes a helical scan mechanism 156, rotating heads 155, a recording medium or tape 153, a modified luminance FM demodulator circuit 158, and a modified control track playback circuit 160 coupled to a control track head 161 via a switch 162 and other associated circuits. The demodulator circuit 158 receives the played back video signal via the rotating heads 155 and a lead 157, and is modified to include at its output an inverter circuit 164 and a switch 166. The output of the inverter circuit 164 is coupled to a descramble input of the switch 166 while a second normal input of the switch is coupled to bypass the inverter circuit 164. The output of the switch 166 is supplied back to an input of de-emphasis/LPF/etc., circuits 168 conventionally found in a VCR demodulator circuit. Thus, the modified luminance component, previously modified by inverting the luminance via the inverter and clamp circuits 142, 144 of FIG. 9, is re-inverted by the inverter circuit 164 and the descramble input of switch 166 to allow it to be properly demodulated in response to authorization via the decode command on the lead 85. See FIG. 7B. The demodulated luminance component is combined with a chrominance component supplied via a lead 170 and the proper video signal, with white pulses 42, 44 still added, is supplied to the signal processing means 74 of FIG. 7B via the lead 75.

In the embodiment in which the audio signal with data and pilot is recorded in and recovered from a longitudinal track in the tape 153, a linear audio head 159 recovers the signal and supplies it to VCR audio circuits 163. The circuits 163 in turn supply the encoded audio signal with the authorization data and the pilot tone to the signal processing means 74 of FIG. 7B via the lead 79.

In the alternative embodiment in which the scrambled audio signal is recorded in the Hi-Fi tracks along with the video signal via the rotating heads 155, the audio signal is recovered via a lead 165 and the rotating heads 155 rather than by the linear audio head 159. The recovered signal is processed in the VCR audio circuits 163 and supplied on the lead 79 as the VCR audio signal of previous mention in FIG. 7B.

The control track playback circuit 160 is modified to include the switch 162 which, in response to authorization by the decode command on the lead 85 (FIG. 7B), reverses the connections between the control track reader circuit 160 and the control track head 161. This "inverts", that is, re-reverses the control track signal such that the correct edge of the control track square wave is used, as previously discussed, to allow successful playback of the tape by an authorized user.

Figure 11:
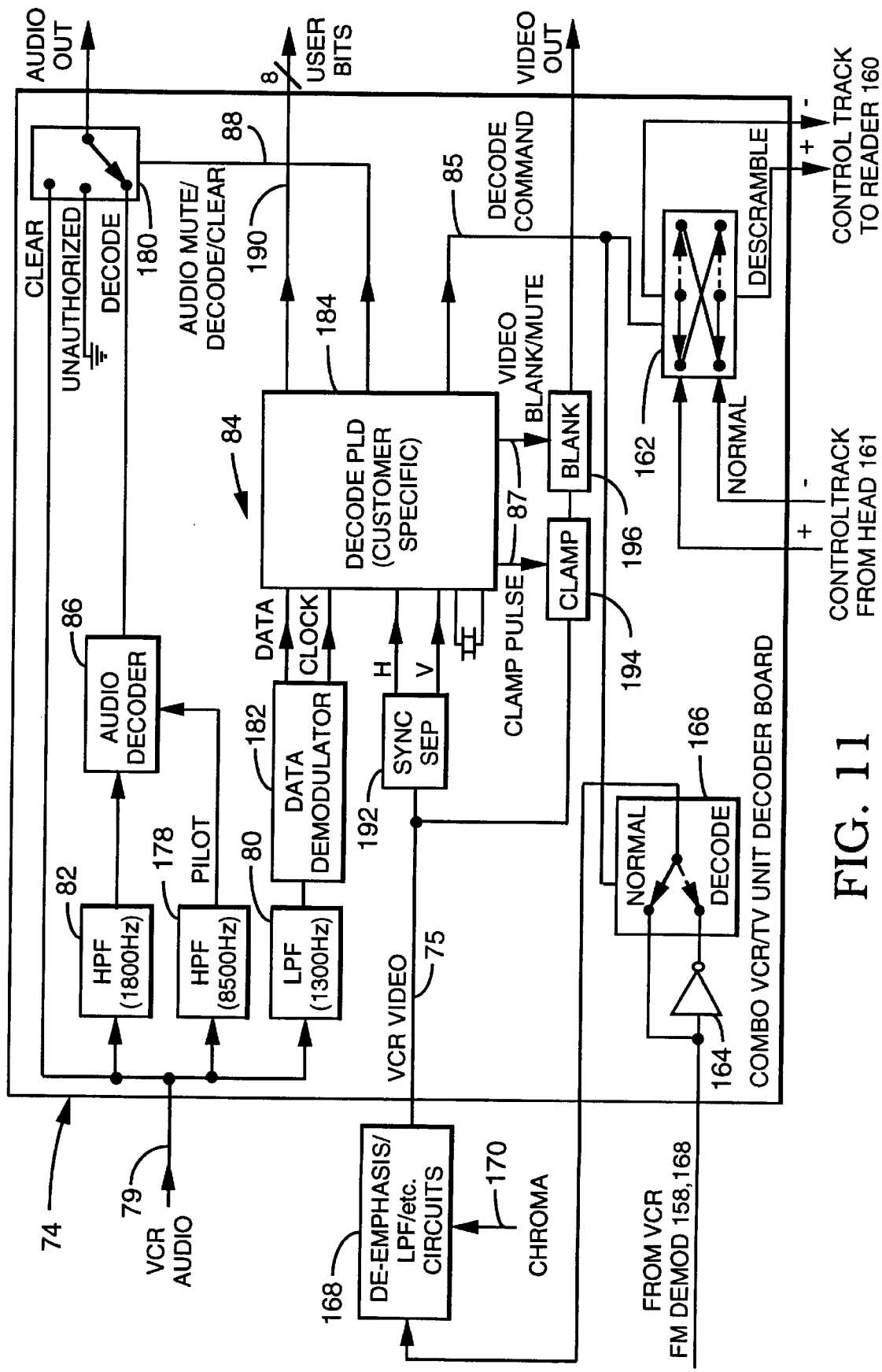
FIG. 11 is a block diagram of a video/audio combination unit decoder board of the combination VCR/TV unit modified in accordance with the invention.

FIG. 11 illustrates in further detail the signal processing means 74 of FIG. 7B and includes several of the same components, similarly numbered. The signal processing means 74 is assembled on a single combo decoder board and is part of the combo unit of previous mention. The audio signal including the authorization code and the pilot tone is supplied on the lead 79 from the VCR 72, to the LPF 80 and also to the HPF 82, wherein the HPF 82 is coupled to the audio decoder circuit 86, as shown in FIG. 7B. A HPF 178 of, for example, with a cut-off at 8500 Hz, is coupled to the audio signal and provides the means for recovering the 8900 Hz pilot tone added to the audio signal by the oscillator 132 of FIG. 8B. The pilot tone is supplied to the decoder circuit 86 and is used to enhance the recovery of an optimal audio signal as further described in FIG. 12. The audio signal from HPF 82 is decoded by a frequency shifting technique in the decoder circuit 86 which is the reverse of the frequency shifting technique of the encoder 107 of FIG. 8B. The decoded audio signal is supplied to a decode input of an audio switch 180 and thence to the audio amplifier/speaker means 77 of previous mention in FIG. 7B, when the proper authorization is received. The VCR audio signal on lead 79 also is supplied to a clear input of the audio switch 180, whereby the audio signal is bypassed around the electronics of the signal processing means 74 in the event that a clear, that is, non-scrambled tape, is being played back by the VCR 72.

The LPF 80 is coupled to a data demodulator circuit 182 which supplies a data signal comprising the authorization code specific to a customer, and also a clock signal of selected frequency, to a customer specific logic circuit 184. The demodulator circuit 182 and logic circuit 184 comprise the data processor circuit 84 of FIG. 7B. The data signal contains, by way of example only, the 8900 Hz pilot tone which is used as a clock to determine time base errors in the audio played back via the VCR 72, as further described in FIG. 12. The logic circuit 184 may be, for example, a Programmable Logic Device which decodes the authorization code embedded in the data separated from the audio signal, and then provides several control signals which permit playback of a descrambled video/audio signal by an authorized customer but which prevent such playback for an unauthorized user. To this end, the logic circuit 184 generates the audio mute/decode/clear signal on the lead 88, the video decode command on the lead 85, the control signals on the leads 87 as previously described in FIG. 7B, and also supplies an output of eight user bits on a lead 190 which contain the added customer specific information. The audio mute/decode/clear signal controls the switch 180 to allow a clear tape to be bypassed, to mute the audio signal when authorization for playback is not matched in the logic circuit 184, and to pass the decoded and descrambled audio signal when authorization is detected in the logic circuit.

The video signal is supplied from the VCR 72 to the signal processing means 74 via the lead 75 and in particular to a sync separator 192 and a clamp circuit 194. As shown in FIG. 11, the inverter circuit 164 and the switch 166 of FIG. 10 actually are located in the decoder board of FIG. 11. Thus, the circuit modifications of the invention, which are made to the combo VCR/TV unit, are located on the decoder board which simplifies the manufacturing and conversion processes. The de-emphasis/LPF/etc. circuits 168 shown in FIGS. 10 and 11 are part of the VCR 72 signal processing. The sync separator 192 supplies the usual horizontal sync (H sync) and vertical sync (V sync) pulses to the logic circuit 184. The H and V sync pulses are used to enable blanking the white pulses 42, 44 which were added in the scrambling process. To this end, the DC component of the video signal is restored by the clamp circuit 194 in response to a clamp pulse from the logic circuit 184, which forms one of the control signals on the lead 87 of FIG. 7B. The clamped video is then selectively blanked in a blank circuit 196 in response to a video blank/mute timing signal forming another control signal on the lead 87 from the logic circuit 184, wherein the timing signal is derived from the H and V sync pulses. Blanking of the video signal is provided in the overscan portions (14, 16, 9 of FIG. 3) to blank out the white pulses previously added to the left, right and bottom edges of the video picture. Thus, blanking occurs for two periods of, for example, 3.5 μs each at the beginning and end of a line and for the last four lines of the active video in both fields. Blanking of the overscan portions is preferred since in an authorized decoder the white pulses are still seen as white pulses because the video signal has been re-inverted via the inverter circuit 164. A problem may exist due to the fact that there is little space for the overscan portions between the active video area which can be seen and the overall video area. As a VCR ages, the H and V scanning is likely to change and it is preferable to have a black area around the viewable picture rather than objectionable white pulses.

If authorized by the logic circuit 184 via the blank/mute signal on the lead 87, the resulting descrambled video signal is supplied to the display device 76, as described in FIG. 7B. Conversely, the video signal is entirely blanked and thus muted in response to the blank/mute signal from the logic circuit 184 when playback is attempted by an unauthorized user, that is, if the PLD 184 detects an unauthorized code in a scrambled tape. If the code is an authorized code, the video signal is supplied to the display device 76. In the event that the logic circuit 184 detects that the video/audio signal, that is, the recorded tape being played back, is a clear tape, that is, has not been scrambled, the video and audio signals are passed through the signal processing means 74 unaffected via the blank circuit 196 and the audio switch 180.

The decode command on the lead 85 from the logic circuit 184 also is used to control the position of the control track switch 162 of previous description in FIG. 10, which physically also is located however in the decoder board of FIG. 11. The switch 162 is used to reverse the connections to the control track head 161 which, in effect, inverts the control track square wave signal. This causes the wrong edge of the square wave to be detected by unauthorized player devices which in turn causes disruption in the played back video signal. As previously discussed in FIG. 9, further scrambling effects are imparted to the video signal by position modulating the detected wrong edge of the control track signal.

FIG. 12 illustrates circuits corresponding to the audio decoder circuit 86, which receives the scrambled VCR audio signal with authorization data and pilot tone on the lead 79 from the VCR 72, FIG. 7B, which is a fairly faithful reproduction of the audio signal with data supplied by the scramble circuits of FIG. 8B. The VCR audio signal with data and pilot is supplied to the high pass filter (HPF) 82 of 1.8 kHz, and to high pass filter (HPF) 178 of 8500 Hz. In general, the HPF 82 allows all of the audio information to pass, which then is decoded by the frequency spectrum shifting (decoder) circuit 86 of previous mention in FIGS. 7B, 11, which is the inverse of the (shifting circuit) encoder 107 of FIG. 8B. The audio signal in essence is spectrally shifted back down to its original baseband spectrum, and the recovered audio signal is supplied to the audio amplifier/speaker means 77 as shown in FIG. 7B.

More particularly, as discussed below with reference to FIG. 12, the VCR scrambled audio signal (off tape) consists of a frequency spectrum shifted signal from 2.225 kHz to about 7.2 kHz, with time base instabilities and a pilot signal at about 9 kHz which tracks the off tape (record and or playback) time base instabilities. In essence, the original program audio is low pass filtered and shifted up or offset in spectrum by about 2.225 kHz. When decoding, the tape instabilities are referenced to the offset frequency of 2.225 kHz. Thus to achieve proper decoding, the carrier signals for decoding must somehow subtract the off tape instabilities at the offset frequency. It should be known that the frequency of the pilot tone of previous mention in FIG. 11, is four times the offset frequency and thus has four times the instability referenced to the offset frequency. It follow that the present invention provides a unique method for descrambling an off tape audio signal which is frequency spectrum shifted (as opposed to inverted frequency spectrum) with substantially nulled time base errors.

To this end, in FIG. 12, the 8500 Hz HPF 178 recovers the 9 kHz pilot tone while rejecting the scrambled audio spectrum signal and its associated data channel centered around 800 Hz. The output of the HPF 178 is a 9 kHz pilot tone that faithfully tracks the off tape time base errors. Bandpass filters are not used here because they tend to "flywheel" or average out the off tape instabilities. A pilot lock oscillator 202 used for drop out compensation runs essentially at the pilot signal's frequency and phase. The output of the lock oscillator 202 is then 9 kHz+4ΔF, where ΔF represents the time base error off tape for the offset frequency. The output of the lock oscillator is coupled to a divide-by-2 counter 204, whose output is then 4500 Hz+2ΔF. A 14 kHz signal is supplied to a mixer circuit 206, which mixes the 14 kHz and the 4500 Hz+2ΔF signals to yield an upper sideband tone of 18.5 kHz+2ΔF at the output of a bandpass filter (BPF) 208 of 15 kHz to 22 kHz bandwidth. The BPF 208 practically is realized with high pass and low pass filters to avoid averaging the off tape instabilities. The output of the BPF 208 is fed to a second divide-by-2 circuit 210 which outputs a signal of 9250 Hz+ΔF, which then becomes the first carrier to descramble the scrambled audio signal.

The 1800 Hz HPF 82 is used to remove the data channel at about 800 Hz. Thus the inputs of a mixer circuit 212 are the first carrier with the time base instabilities referenced to the offset frequency (ΔF) and the shifted audio spectrum with time base instabilities (ΔF) from HPF 82. The output of the mixer circuit 212 is an upper and lower sideband signal plus some residual carrier, 9250 Hz+ΔF. This residual carrier is filtered out by a second BPF 214 so that audible residual tones are not present at the output of the decoder 86. The second BPF 214 also is a combination of high pass and low pass filters with a bandpass from about 1.5 kHz to 7.6 kHz. The BPF 214 passes the lower sideband which is from 7025 Hz to about 2 kHz, with the ΔF signal removed, to a mixer circuit 216. It should be noted that in the output of the BPF 214, the time base instabilities are nulled out. The mixer circuit 216 also receives a 7025 Hz carrier and mixes it with the lower sideband from the BPF 214. The output of the mixer circuit 216 is supplied to a low pass filter (LPF) 218 of 5 kHz, which passes the lower sideband of the incoming signal. The LPF 218 provides the descrambled audio signal without time base instabilities, which is supplied from the decoder circuit 86 to the switch 180 (FIG. 11) and thence to the video display device 76 (FIG. 7A).

FIGS. 13A, 13B illustrate chroma scrambling and descrambling circuits which may be employed in another alternative embodiment of the invention. In FIG. 13A, chroma (3.58 MHz) is input to a double balanced multiplier 220. It should be noted for best performance in chroma scrambling or descrambling, the multiplier 220 should have minimum leak through from its inputs to its output. The other input to the multiplier 220 is twice the subcarrier frequency (2×3.58 MHz). The output of multiplier 220 is fed to a chroma bandpass filter (BPF) 222 of 3.58 MHz bandpass. The output of the chroma bandpass filter 222 is then scrambled chroma and is record-able on a VCR. The scrambled chroma has the hues that are not correctable by changing the burst phase when played back on an unauthorized VCR. These incorrect hues are caused in the chroma scrambling by exchanging the upper chroma side bands with the lower chroma side bands. Another way to view this type of chroma scrambling is that the scrambled chroma has the chroma phase angles reflected along either the I or Q axis.

The correct hues can be acquired only by taking the scrambled chroma and mixing it against a twice subcarrier frequency source. FIG. 13B depicts such a chroma descrambler for obtaining the correct hues, wherein the scrambled chroma is supplied to a double balanced multiplier 224, which also receives a twice subcarrier signal. The output of the multiplier 224 is bandpass filtered by a BPF 226 to provide the descrambled chroma.

In FIG. 13A, one can also use this chroma scrambling method similarly in the VCR's color under chroma system (i.e. 629 kHz chroma in VHS). Thus, in FIG. 13 A, balanced mixer 220 has one input with the 629 kHz chroma (down converted from 3.58 MHz video input chroma). The other input of 220 is twice 629 kHz. Band pass filter 222 then becomes a 629 kHz chroma band pass filter. The output of 222 is coupled to the VGR's record head.

For descrambling the color under chroma, FIG. 13B is used with color under frequencies. The 629 kHz chroma from the VCR's playback heads are coupled to first mixer 224. The other input of 224 is twice 629 kHz. The output of 224 is coupled to a 629 kHz chroma band pass filter 226. The output of 226 is then coupled to the chroma up converter circuit (to convert 629 kHz chroma to stabilized 3.58 MHz chroma) of the VCR playback system.

There are, of course, other chroma scrambling schemes such as modifying the burst in the recording process, and then modifying it back during the playback process. For instance in a VHS system, the 629 Khz color under burst phase may be flipped by some phase such as 180 degrees during the recording process and then the 629 kHz color burst may be flipped back 180 degrees during the playback process (before the heterodyne circuit corrects chroma time base errors). The phase change can be done for example, on a field to field basis.

FIG. 14 shows an audio descrambler to descramble frequency shifted spectrum audio from the Hi-Fi track on the tape 153 via the rotating heads 155 and the lead 163, see also FIG. 10. The input of this audio descrambler contains the shifted audio spectrum along with a 19 kHz trigger signal, and is supplied to a mixer 230 and a BPF 232 of 19 kHz. This 19 kHz trigger signal is an optional signal used to synchronize a pre-programmed frequency modulation of the descrambling carriers, 19 kHz into a mixer 230 and or 16 kHz into a mixer 236. For example, this 19 kHz trigger signal may be amplitude modulated with threshold detection, or frequency shifted with frequency detection as a means of triggering a variable frequency oscillator (VFO)

234 into a pre-programmed set of frequencies. Security of the scrambler is enhanced by having the trigger signal occur in a preferably non periodic fashion.

In this descrambler's simplest form, the 19 kHz trigger tone is not used and the VFO 234 outputs fixed 19 kHz and 16 kHz descrambling carriers.

It should be noted that when descrambling audio from the VCR's Hi-Fi track(s), no pilot tone and or pilot tone circuitry for audio time base correction is needed. The VCR's Hi-Fi record and playback time base error is negligible. As a result, when audio descrambling is done as shown in FIG. 14, there is noticeable wow or flutter.

Figure 15:
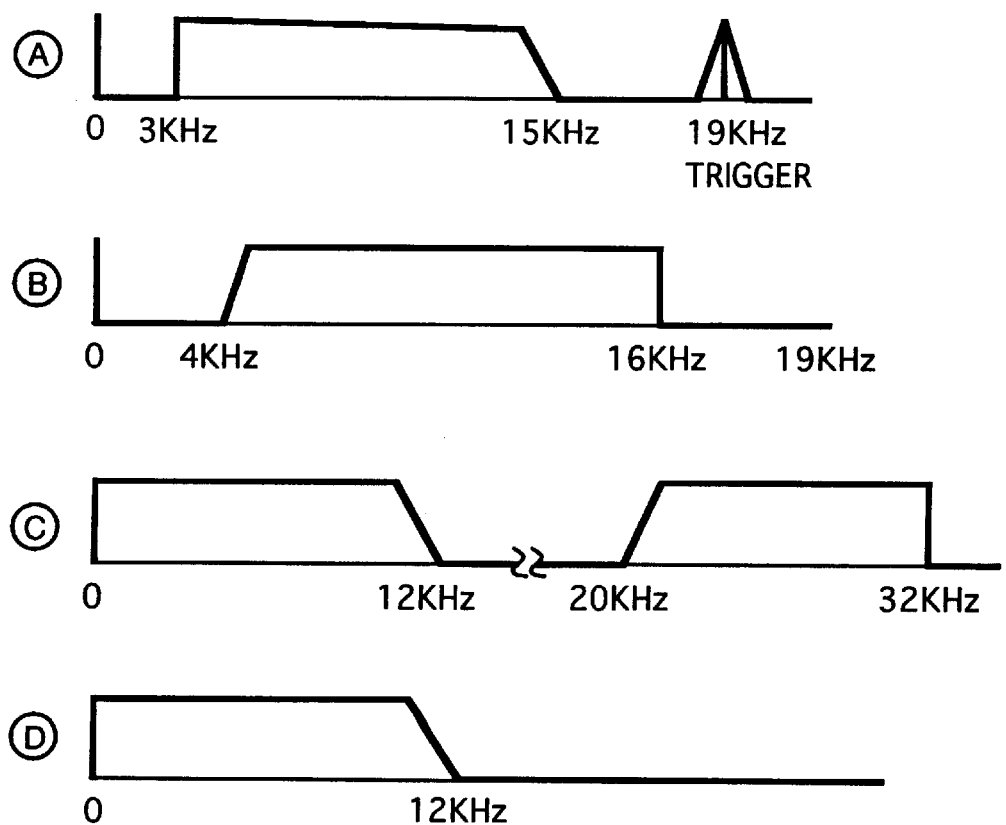
FIGS. 15A–15D are diagrams illustrating waveforms generated at corresponding locations in the circuit of FIG. 14.

FIG. 15A shows the input spectrum to the Hi-Fi audio descrambler of FIG. 14.

FIG. 15B shows the output of the first mixer, 230 of FIG. 14. A 17 kHz low pass filter 238 coupled to the mixer 230 attenuates any residual carrier feedthrough (19 kHz) at the output of mixer 230 so that no audible whistle tone (19 kHz minus 16 kHz=3 kHz whistle tone) is present at the descrambler's output.

FIG. 15C shows the output of the second double sideband balanced mixer 236 of FIG. 14.

FIG. 15D shows the descrambled audio output, which is supplied to the audio monitor 77 via a LPF 240. The 12 kHz low pass filter 240 is used to remove the upper sideband and its harmonics from the output of mixer 236. Any residual carrier (and harmonics of the carrier) feedthrough from mixer 236 is also taken out by this 12 kHz low pass filter.

The descrambler circuit of FIG. 14, consisting of mixer 230, 17 kHz LPF 238, mixer 236 and the 12 kHz LPF 240, is essentially similar to the audio descrambler as described in the previously mentioned U.S. Pat. No. 5,471,531 to Quan, which is incorporated herein by reference. The frequency generation part of FIG. 14 consisting of VFO 234 is similar to the previously mentioned U.S. Pat. No. 5,058,159 to Quan, which is also incorporated herein by reference. Note that the VFO 234 of FIG. 14 generates square waves.

The above description of the invention is illustrative and not limiting: other modifications in accordance with the invention will be apparent to one of ordinary skill in the art in light of this disclosure and are intended to fall within the scope of the appended claims. To illustrate, the video signal scrambling/descrambling techniques of the present invention may be employed without the audio scrambling/descrambling techniques in environments where an audio signal is not needed such as, for example, in surveillance applications. In such instances, the authorization code data still is inserted in the linear audio track of the recording medium. In the technique where the audio signal is recorded in the Hi-Fi track, the authorization code data similarly is recorded in the linear audio track of the recording medium to make it available for enabling the video signal descrambling process of the invention when authorized.

What is claimed is:

1. A method of scrambling a recorded video and audio signal comprising the steps of:
    inverting a luminance component of the video signal just prior to FM modulation of the luminance component within a data recorder;
    adding a video retrace command to an overscan portion of said video signal;
    inverting a normal control track signal having normally used and normally unused edges;
    providing an authorization signal identifying a specific customer; and
    recording the scrambled video signal and the authorization signal onto a recording medium.

2. The method of claim 1 including the step of:
    position modulating the normally unused edges of the reversed control track signal.

3. The method of claim 1 including the step of:
    blanking the overscan portion of the video signal prior to performing the step of adding.

4. The method of claim 3 wherein the step of adding includes inserting a white level pulse into the blanked overscan portion of the video signal, which pulse overlaps the beginning of the active video signal.

5. The method of claim 3 wherein the step of adding includes inserting a white level pulse into the blanked overscan portion of the video signal at the end of the active video signal.

6. The method of claim 3 wherein the step of adding includes inserting white level pulses at selected beginnings and ends of selected lines of the video signal, with the white level pulses alternating in position at the beginning and end of each selected line and from field to field.

7. The method of claim 1 including the steps of:
    selectively scrambling the audio signal;
    inserting the authorization signal in the scrambled audio signal; and
    recording the scrambled audio signal with the authorization signal in an audio track in the recording medium.

8. The method of claim 7 including the steps of:
    providing a pilot tone signal of selected frequency; and
    inserting the authorization and pilot tone signals in the scrambled and recorded audio signal.

9. The method of claim 7 wherein the step of scrambling the audio signal includes fixed or variable frequency shifting of the audio signal baseband frequencies to a selected frequency spectrum above the baseband frequencies.

10. The method of claim 1 including the step of:
    separating the luminance component from the video signal prior to the step of inverting the luminance component.

11. The method of claim 1 including the steps of:
    scrambling the audio signal by fixed or variable frequency shifting of the audio signal to a higher frequency spectrum;
    recording the shifted audio signal in a Hi-Fi track in the recording medium together with the scrambled video signal; and
    recording the authorization signal in an audio track in the recording medium.

12. The method of claim 1 including the steps of:
    separating a chrominance component from the video signal prior to scrambling the video signal; and
    exchanging portions of the chrominance component to provide a scrambled chrominance component for recording onto the recording medium.

13. The method of claim 1 including the steps of:
    separating a chrominance component from the video signal prior to scrambling the video signal; and
    exchanging the upper chroma side band with the lower chroma side band of the chrominance component to provide a scrambled chrominance component for recording onto the recording medium.

14. A method of descrambling previously scrambled and recorded video and audio signals when played back from a recording medium in a data recorder, comprising the steps of:

detecting an authorization signal from data recorded in the recording medium and providing authorization for playing back the descrambled video signal;

re-inverting a previously inverted luminance component of the video signal just after FM demodulation of the luminance component within the data player to enable descrambling the video signal;

blanking the video signal in a selected overscan portion of the video signal to remove any pulses in the overscan portion;

re-inverting a previously inverted control track signal played back from a control track in the recording medium; and playing back the descrambled video signal.

15. The method of claim 14 including the steps of:

descrambling the audio signal when authorized by the authorization signal; and playing back the descrambled audio signal with the descrambled video signal.

16. The method of claim 15 including the steps of:

providing a customer specific digital code in the scrambled audio signal, which code corresponds to the authorization signal;

comparing the digital code in the audio signal with the code specific to the customer; and providing control signals authorizing the play back of the descrambled video and audio signals if the compared codes match.

17. The method of claim 16 wherein:

the control signals include an audio mute/decode/clear signal which provides the steps of;

preventing passage of the descrambled audio signal if unauthorized;

allowing passage of the descrambled audio signal if authorized; and bypassing the audio signal around the descrambling process if the audio signal was not scrambled.

18. The method of claim 16 wherein:

the control signals include a decode command which provides the steps of:

reversing connections to the modified control track signal when authorized to provide said step of inverting the played back modified control track signal; and routing the luminance component through an inverter circuit when authorized to provide said step of inverting the played back luminance component.

19. The method of claim 16 wherein:

the control signals include a video/blank mute signal which provides the steps of;

blanking the video signal in the selected overscan portion thereof when authorized; and preventing or allowing passage of the descrambled video signal when unauthorized or authorized, respectively.

20. The method of claim 14 including the steps of:

providing white level pulses in selected overscan portions of the video signal; and turning off the video signal in the selected overscan portions to provide the step of blanking the video signal.

21. The method of claim 14 wherein the scrambled audio signals have been recorded in a Hi-Fi track in the recording medium, including the steps of:

recovering the shifted audio signal from the Hi-Fi track in the recording medium; and descrambling the recovered audio signal when authorized by the authorization signal.

22. The method of claim 21 wherein the authorization signal is recorded in a linear audio track in the recording medium, including the step of:

recovering the authorization signal from the linear audio track to enable the steps of descrambling the audio and video signals.

23. A method of scrambling, recording and subsequently descrambling and playing back a video/audio signal, wherein the recording includes a synchronization control signal in a control track of a recording medium for use in controlling the video/audio signal playback, comprising the steps of:

adding white level pulses to selected overscan portions of the video signal;

FM modulating the video signal during the recording thereof;

inverting a luminance component of the video signal including the added white level pulses just prior to FM modulation of the luminance component;

detecting the inverted white level pulses as synchronizing pulses during the recording to cause instabilities and corresponding scrambling of the video signal;

providing authorization data identifying a specific customer;

recording the scrambled video signal and the authorization data in the recording medium;

detecting the authorization data when subsequently playing back the recorded scrambled video signals;

re-inverting the luminance component and the white level pulses of the played back scrambled video signal when authorized by the detected authorization data;

blanking the white level pulses added to the selected overscan portion of the video signal to remove the pulses when authorized by the detected authorization data;

wherein the steps of re-inverting and blanking provide descrambling of the video signal; and playing back the descrambled video signal when authorized by the detected authorization data of the re-inverting and blanking steps.

24. The method of claim 23 including the steps of:

scrambling the audio signal by selectively shifting it from an original frequency spectrum to a higher frequency spectrum;

wherein the step of recording includes recording the audio signal in the recording medium;

descrambling the audio signal by shifting it back to the original frequency spectrum; and playing back the descrambled audio signal along with the descrambled video signal when authorized.

25. The method of claim 24 wherein:

the step of recording includes recording the authorization data with the audio signal in an audio track; and the steps of descrambling and playing back include recovering the authorization data, along with the scrambled audio signal, from the audio track, to enable the descrambling of the video and audio signals.

26. The method of claim 24 wherein:

the step of recording includes recording the scrambled audio signal in a Hi-Fi track in a recording medium; and the steps of descrambling and playing back include recovering the scrambled audio signal from the Hi-Fi track, and descrambling the recovered audio signal by selectively shifting it back to the original frequency spectrum.

27. The method of claim 24 including the steps of:

inserting a pilot tone in the audio signal during the video/audio scrambling process;

detecting the pilot tone during the playback of the descrambled video/audio signals to determine the presence of time base errors therein; and correcting the timing of the playback process to remove the time base errors.

28. The method of claim 23 including the steps of:

separating a chrominance component from the video signal prior to scrambling the video signal;

exchanging the upper chroma sideband with the lower chroma sideband of the chrominance component prior to the step of recording to further scramble the video signal; and upon playback, exchanging the chroma sidebands back to their original relationship to reconstitute the chrominance component of the video signal when authorized.

29. The method of claim 23 including the steps of:

inverting the synchronization control track signal during the video scrambling to switch the functions of the normally unused edges of the control track signal with the normally used edges thereof; and re-inverting the inverted control track signal when authorized by the detected authorization data during the playback of the descrambled video signal.

30. The method of claim 29 including the steps of:

position modulating the normally unused edges of the inverted synchronization control track signal during the step of inverting it; and position demodulating the modulated edges of the re-inverted control track signal during the step of re-inverting it.

31. Apparatus for scrambling, recording in a recording medium, and subsequently descrambling on playback, video/audio signals, comprising:

means receiving the video signal for adding white level pulses to a selected overscan portion of the video signal to provide a modified video signal, means for FM modulating the modified video signal during the recording process;

means disposed prior to the FM modulating means for inverting the luminance component and also the added white level pulses of the modified video signal before the FM modulation;

means integral with the recording process for detecting the inverted white level pulses as synchronizing pulses to cause horizontal instabilities and scrambling of the video signal;

means for providing authorization data indicative of a specific user;

means for recording the modified and FM modulated video signal and the authorization data on the recording medium;

means for detecting the authorization data in the recording medium during the playback process and for providing an authorization signal indicative of the specific user;

means for FM demodulating the played back video signal;

means for inverting the FM demodulated video signal and white level pulses in response to the authorization signal;

means for removing the white level pulses from the selected overscan portion of the played back video signal, and means for displaying and recovering the descrambled video signals when authorized by the authorization signal.

32. The apparatus of claim 31 including:

means receiving the audio signal for scrambling the audio signal;

means for recording the scrambled audio signal on the recording medium; and means for descrambling the recorded scrambled audio signal during the playback process.

33. The apparatus of claim 32 wherein:

the means for recording includes means for recording the scrambled audio signal and the authorization data in an audio track in the recording medium; and the means for descrambling includes means for recovering the authorization data and the audio signal from the audio track and for descrambling the audio and video signals in response to the recovered authorization data.

34. The apparatus of claim 33 wherein the means for scrambling the audio signal and for recording the audio signal with the authorization data includes:

frequency spectrum shifting means for shifting the audio signal baseband frequencies to a selected frequency spectrum above the baseband frequencies;

means for providing a use specific authorization code corresponding to the authorization data;

means for modulating the authorization code with a carrier signal; and means for adding the modulated authorization code to the audio signal.

35. The apparatus of claim 32 wherein:

the means for recording includes means for recording the scrambled audio signal in a Hi-Fi track in the recording medium;

the means for descrambling the audio signal includes frequency shifting means receiving a recovered audio signal from the Hi-Fi track, and for descrambling the recovered audio signal by a frequency shifting process.

36. The apparatus of claim 32 wherein the means for scrambling the audio signal and for adding the authorization data includes:

means for adding a pilot tone to the authorization data added to the audio signal; and means receiving the played back audio signal for detecting the pilot tone to detect and correct time base errors in the audio signal.

37. The apparatus of claim 31 including:

means for separating a chrominance component from the video signal;

means for exchanging the upper chroma sideband with the lower chroma sideband of the chrominance component prior to recording in the recording medium;

means in the playback process for exchanging the chroma sidebandsphase back to their original relationship to reconstitute the descrambled video signal for playback.

38. The apparatus of claim 31 including:

means disposed prior to the means for adding white level pulses for blanking the selected overscan portion prior to adding the white level pulses; and said means for removing the white level pulses comprises blanking means for blanking the descrambled video signal when playback is authorized.

39. The apparatus of claim 31 wherein the video signal includes lines of active video, wherein the means for adding inserts white level pulses at selected beginnings and ends of selected lines of the lines of active video, with the white level pulses alternating in position at the beginning and end of each selected line and from field to field.

40. The apparatus of claim 31 wherein a control track signal of normally used and normally unused edges is recorded in the recording medium, including:

means for inverting the control track signal;

means for position modulating the normally unused edges of the inverted control track signal to enhance the scrambling of the video signal;

means for position demodulating the modulated edges of the inverted control track signal; and means for re-inverting the played back demodulated control track signal.

41. A method of scrambling recorded video signal wherein the recording includes a normal control track signal in a control track, comprising the steps of:

inverting the normal control track signal in the control track during the scrambling to provide an inverted control track signal in which the functions of the normally unused edges of the normal control track signal are switched with the normally used edges thereof; and recording the inverted control track signal in the control track of the recording.

42. The method of claim 41 including descrambling the scrambled video signal during subsequent playback thereof, including the step of:

re-inverting the inverted control track signal during the descrambling to recover the normally used and unused edges thereof; and playing back the descrambled video signal when authorized.

43. The method of claim 41 including the step of:

position modulating the normally unused edges of the inverted control track signal during the step of inverting it.

44. The method of claim 43 including descrambling the scrambled video signal during subsequent playback thereof, including the steps of:

re-inverting the inverted control track signal during the playback and descrambling to recover the normally used and unused edges thereof; and position demodulating the modulated edges of the re-inverted control track signal during the playback and descrambling.

45. A method of scrambling a video signal formed of lines and fields of video, to prevent viewing of the video signal as well as prevent a viewable reproduction of a subsequent recording of the video signal, comprising the steps of:

adding white level pulses at selected beginnings and ends of selected lines of video, with the white level pulses alternating in position at the beginning and end of each selected line and from field to field of video;

inverting the video content of the video signal to likewise invert the white level pulses; and detecting the inverted white level pulses as synchronizing pulses during the recording to cause horizontal instability in the lines of video.

46. The method of claim 45 including:

FM modulating the lines of video during the recording of the video signal; and wherein the step of inverting the video content is performed just prior to the step of FM modulating.

47. A method of scrambling, recording and subsequently descrambling and playing back a video signal having luminance and chrominance components, comprising the steps of:

separating the chrominance component from the video signal prior to scrambling the video signal;

exchanging the upper chroma sideband with the lower chroma sideband of the chrominance component prior to recording the thusly scrambled video signal; and upon playback, re-exchanging the upper and lower chroma sidebands back to their original relationship to reconstitute the chrominance component of the video signal.

* * * * *